United States Patent
Lougheed, III et al.

(10) Patent No.: US 12,079,891 B2
(45) Date of Patent: Sep. 3, 2024

(54) SYSTEMS AND METHODS FOR VERIFYING AND MANAGING DIGITAL CREDENTIALS

(71) Applicant: Axuall, Inc., Shaker Heights, OH (US)

(72) Inventors: Charles Lougheed, III, Shaker Heights, OH (US); Lakshman Tavag, Cleveland, OH (US); Jeffrey Stern, Cleveland, OH (US)

(73) Assignee: AXUALL, INC., Cleveland, OH (US)

( * ) Notice: Subject to any disclaimer, the term of this patent is extended or adjusted under 35 U.S.C. 154(b) by 586 days.

(21) Appl. No.: 16/735,241

(22) Filed: Jan. 6, 2020

(65) Prior Publication Data

US 2020/0220726 A1    Jul. 9, 2020

Related U.S. Application Data

(60) Provisional application No. 62/788,522, filed on Jan. 4, 2019.

(51) Int. Cl.
*G06F 16/21* (2019.01)
*G06Q 20/36* (2012.01)
(Continued)

(52) U.S. Cl.
CPC ....... *G06Q 50/2057* (2013.01); *G06F 16/211* (2019.01); *G06Q 20/363* (2013.01); *G06Q 30/018* (2013.01); *G06Q 30/0283* (2013.01)

(58) Field of Classification Search
CPC ......... H04L 9/321; H04L 9/0637; H04L 9/50; H04L 2209/56; H04L 9/3239;
(Continued)

(56) References Cited

U.S. PATENT DOCUMENTS

| 7,877,790 B2 * | 1/2011 | Vishik | G06V 40/10 |
| | | | 713/186 |
| 2002/0016777 A1 * | 2/2002 | Seamons | H04L 63/0823 |
| | | | 705/76 |

(Continued)

OTHER PUBLICATIONS

International Search Report and Written Opinion from PCT/US2020/012384 dated Mar. 13, 2020.
(Continued)

*Primary Examiner* — Patrick Mcatee
*Assistant Examiner* — Vincent I Idiake
(74) *Attorney, Agent, or Firm* — Calfee, Halter & Griswold LLP

(57) ABSTRACT

Systems and methods which provide the ability for users to track the lifecycle and conditional rules associated with credentials, which can include digitally verified third-party assertions of identity, education, licensing, work history, provenance, authenticity, outcomes, ingredients, etc. through a network of certified primary source or primary source equivalent issuers of credentials. Verifiable data registry technology can be used to provide access to information associated with the credentials, such as validity and schemas. Credential presentation and subscription processes are also utilized. Ecosystem communication and management functions can be executed through various agent instances associated with the actors, including administrators. Rating systems and fee transactions are also managed.

13 Claims, 24 Drawing Sheets

(51) Int. Cl.
*G06Q 30/018* (2023.01)
*G06Q 30/0283* (2023.01)
*G06Q 50/20* (2012.01)

(58) Field of Classification Search
CPC .. H04L 9/3268; H04L 63/0884; G06F 16/211; G06Q 20/363; G06Q 30/0283; G06Q 10/00
See application file for complete search history.

(56) References Cited

U.S. PATENT DOCUMENTS

| | | | |
|---|---|---|---|
| 2003/0115253 A1* | 6/2003 | Barbir | G06F 16/9535 |
| | | | 709/202 |
| 2005/0066050 A1* | 3/2005 | Dharamshi | H04L 69/329 |
| | | | 709/232 |
| 2014/0281525 A1 | 9/2014 | Acar et al. | |
| 2015/0073870 A1 | 3/2015 | Shah | |
| 2017/0359184 A1 | 12/2017 | Camenisch et al. | |
| 2018/0343263 A1* | 11/2018 | Camenisch | H04L 9/3271 |
| 2020/0238952 A1* | 7/2020 | Lindsay | G06V 30/194 |

OTHER PUBLICATIONS

Office Action from Canadian Patent Application No. 3,125,621 dated Dec. 8, 2023.

\* cited by examiner

600

616

Credential

Dr. Mary has a Bachelor of Science and Arts

```
{
  "@context": [
    "https://www.w3.org/2018/credentials/v1",
    "https://www.w3.org/2018/credentials/examples/v1"
  ],
  "id": "http://example.gov/credentials/3732",
  "type": ["VerifiableCredential", "UniversityDegreeCredential"],
  "issuer": "https://example.edu",
  "issuanceDate": "2010-01-01T19:73:24Z",
  "credentialSubject": {
    "id": "did:example:ebfeb1f712ebc6f1c276e12ec21",
    "degree": {
      "type": "BachelorDegree",
      "name": "Bachelor of Science and Arts"
    }
  },
  "proof": {
    "type": "RsaSignature2018",
    "created": "2010-06-18T21:19:10Z",
    "proofPurpose": "assertionMethod",
    "verificationMethod": "https://example.com/jdoe/keys/1",
    "jws": "eyJhbGciOiJSUzI1NiIsImI2NCI6ZmFsc2UsImNyaXQiOlsiYjY0Il0
            ..BJMwvFA1C00nS8BBTnBXKbBF9XKsa12NEWwR2aMYT0UknyXirtXntew3NB
            Bn2h09fcCZrvnC1beP9Qm6kzFJ1I1H1dHgeDIS81B6-IxXnPRmY8ySovc4
            QUBMJx0UVYsEl4NvBcTwKj6xAlBaZ_ZNZuj0qLrRZqMeBF5kKyikcJR
            nSVWAy5eHYq_g8nyHyXE6OkrneS3MR78hAnmM31aA0BSxBrd6a00L78lM-
            Fbm50jAQ23i7GYBmHmRuPoBIOjjMEgnBlg13n0ilyxbHxHHLBX4a88Rkba
            og2gt10hQ0nFxx418MWw_omMCj6sqqB8cZzqEjw"
  }
}
```

Credential Information 617

Claim 618

Proofs 619

FIG. 6

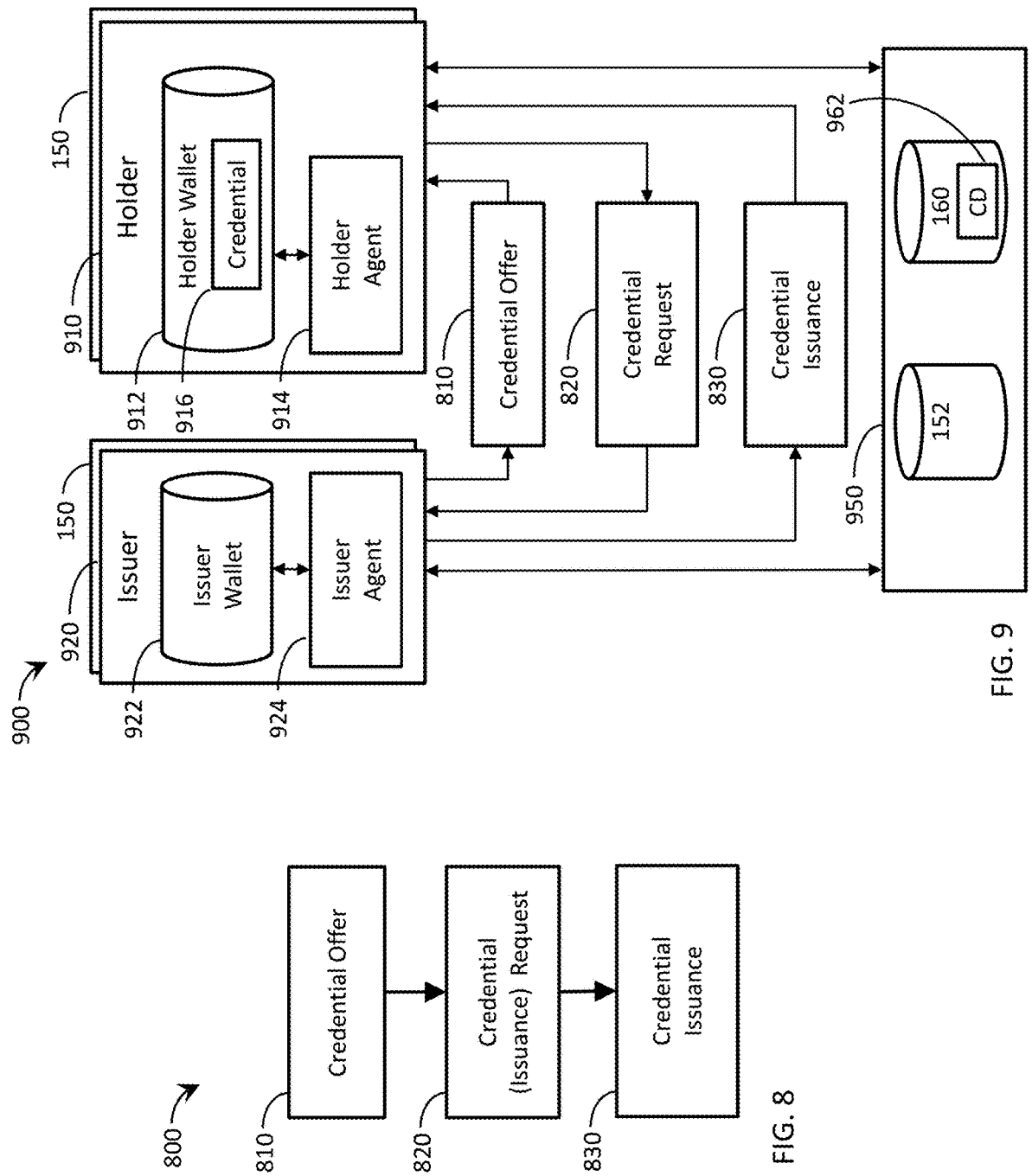

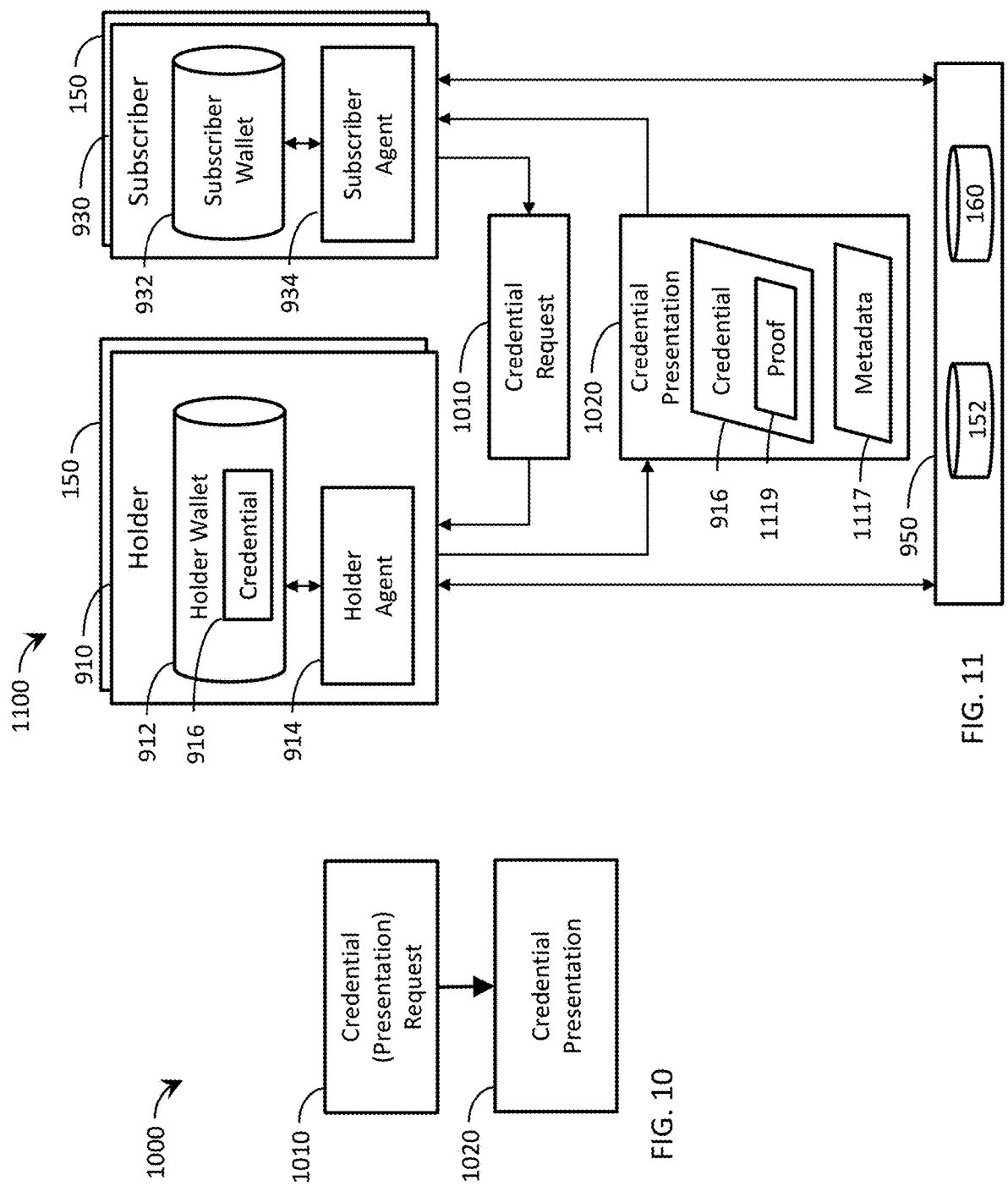

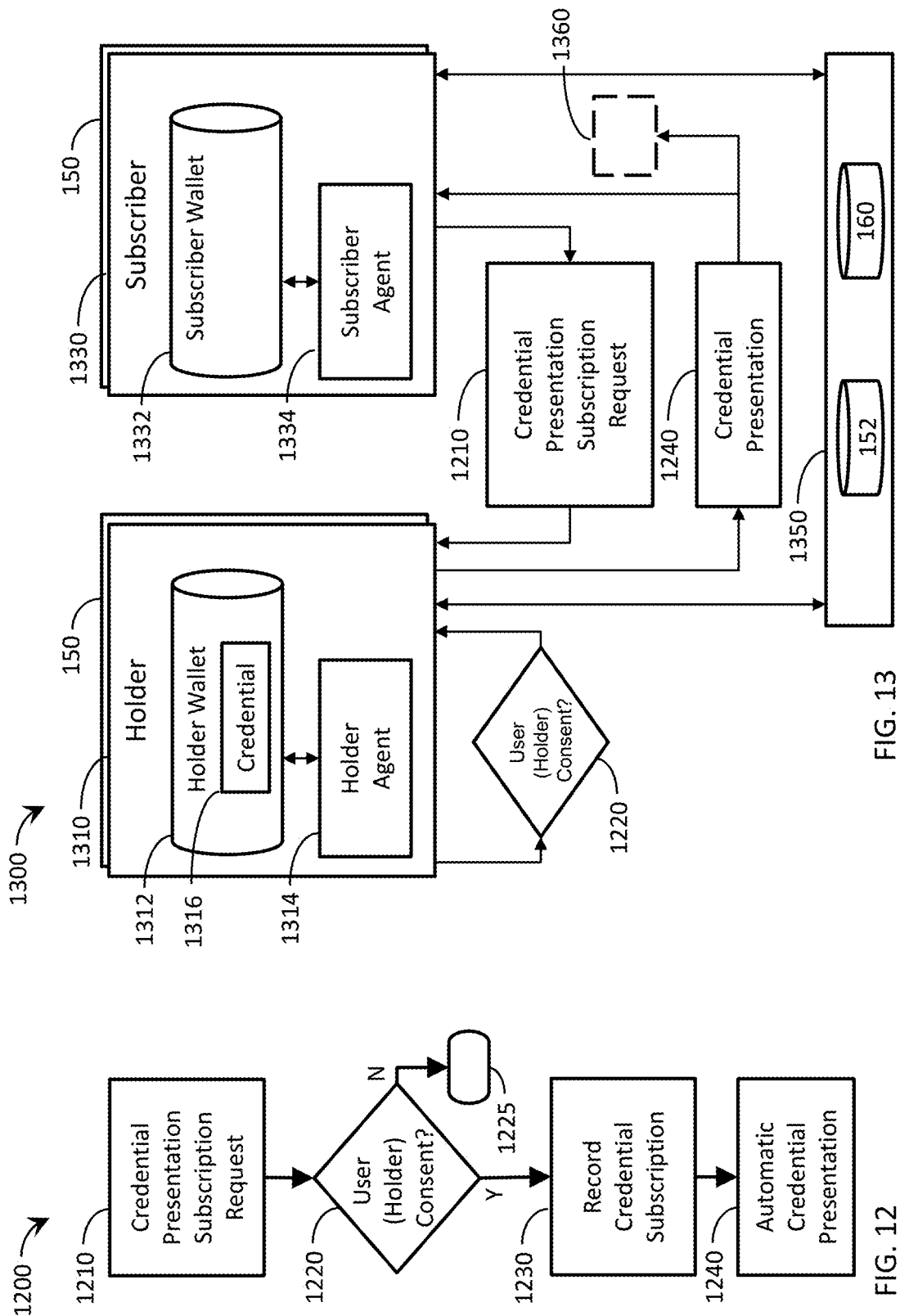

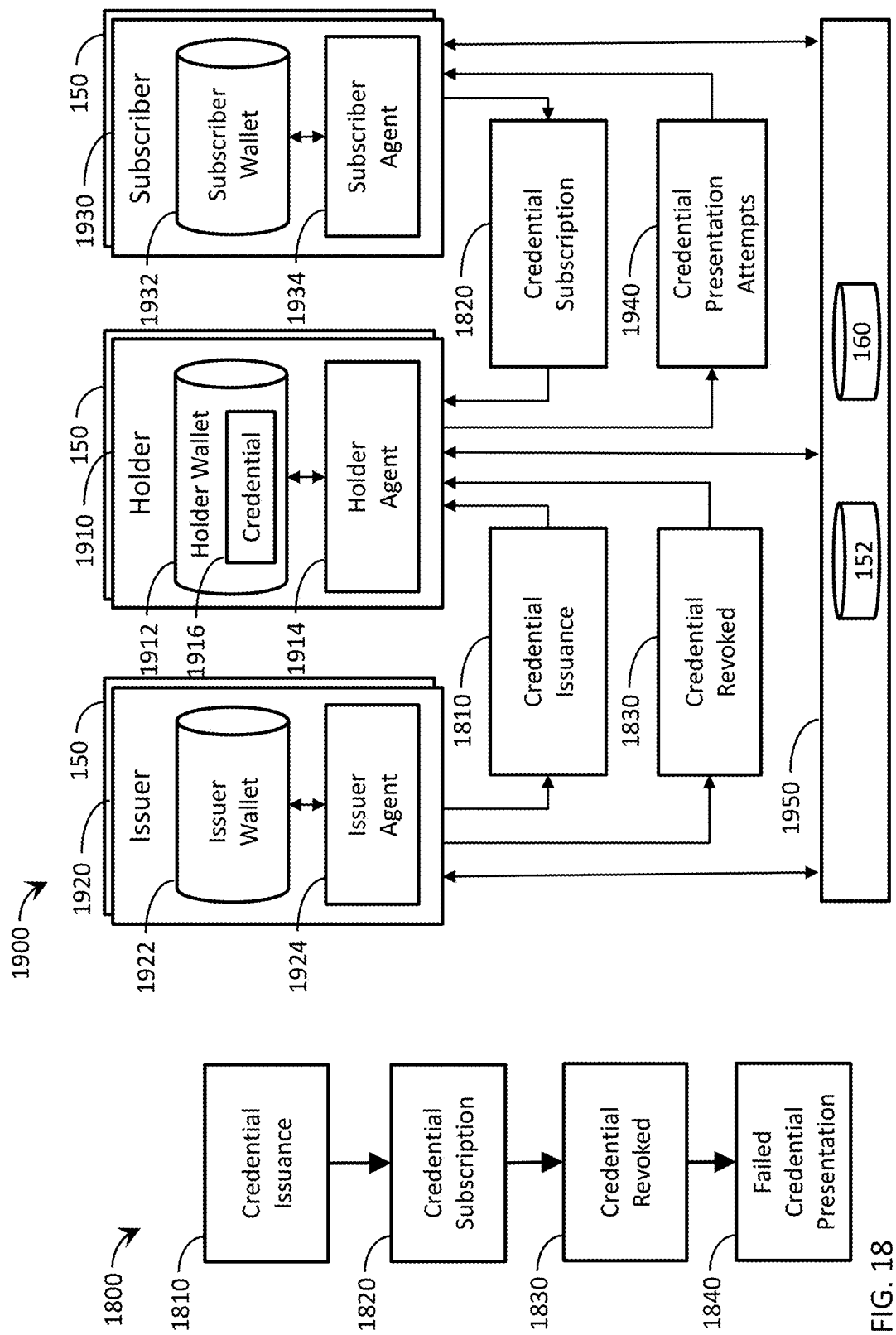

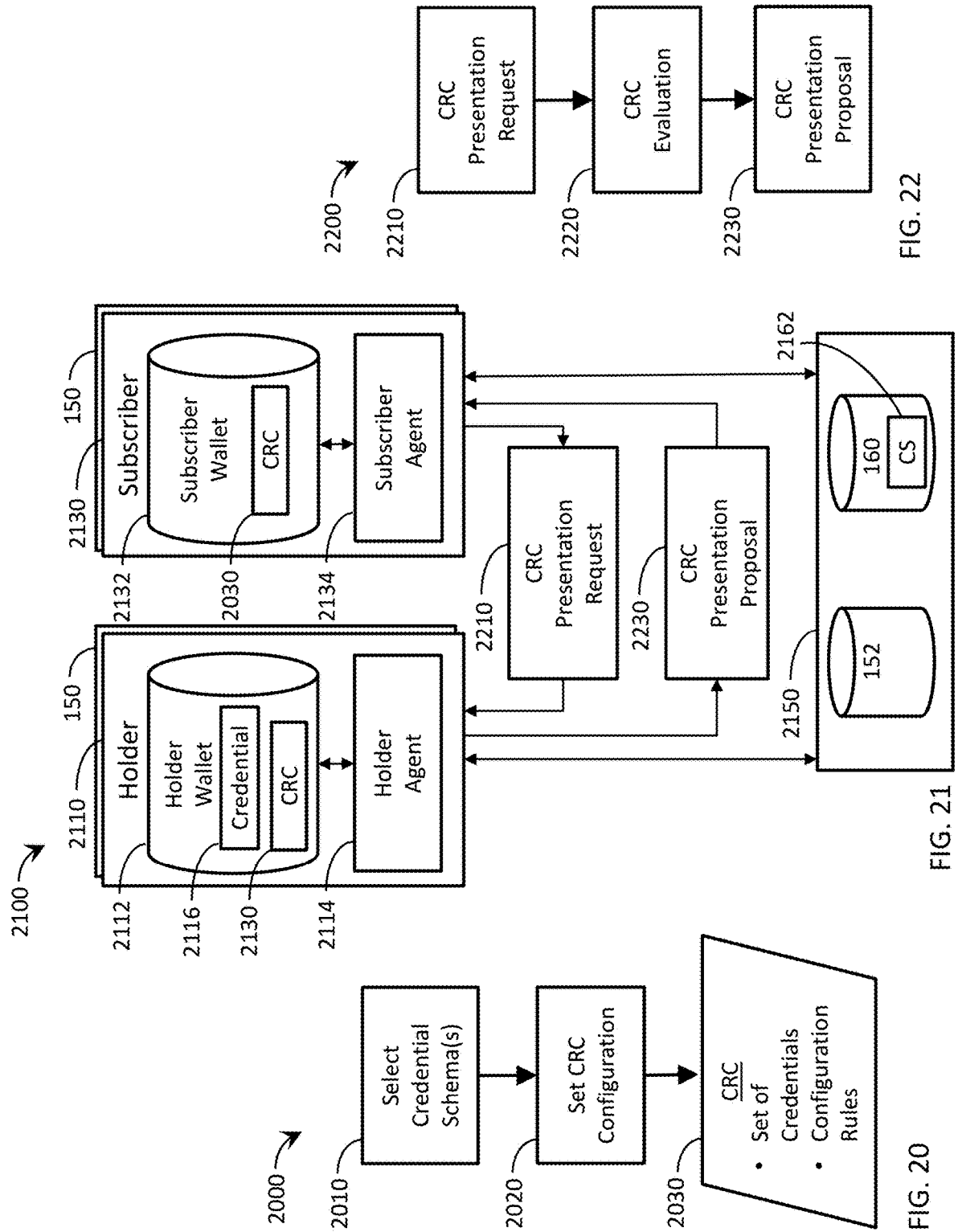

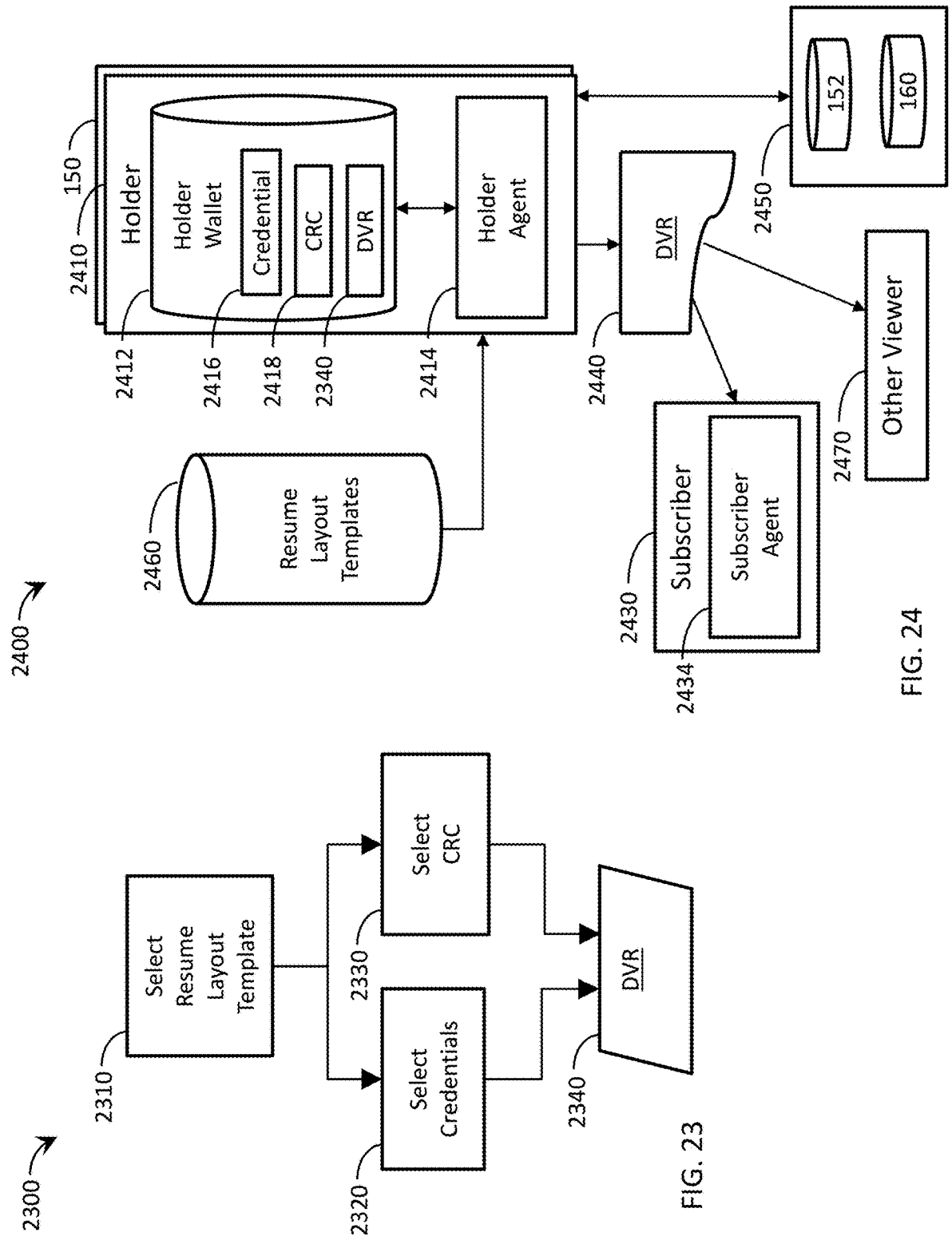

FIG. 33

SYSTEMS AND METHODS FOR VERIFYING AND MANAGING DIGITAL CREDENTIALS

CROSS-REFERENCE TO RELATED APPLICATIONS

This application claims the benefit of U.S. provisional patent application Ser. No. 62/788,522, filed Jan. 4, 2019, which is fully incorporated herein by reference.

FIELD OF THE INVENTION

Aspects of the disclosed technology relate to third party verification of facts, including, for example, acquisition, storage, and/or on-going verification of digital credentials. Credentials can include digital proofs for verification of assertions, including identity, education, licensing, work history, provenance, authenticity, performance, etc., which can be applicable to people, places, and/or things in many industries, including but not limited to, healthcare, financial services, transportation, manufacturing, government, social services, security, and retail.

BACKGROUND

The process of proving identity and credentials can be cumbersome and can waste valuable time and money, representing a risky and expensive problem for many industries, including healthcare, financial services, transportation, manufacturing, government, social services, security, retail, etc. The veracity of those verifying credentials can vary and result in inaccurate and/or incomplete verifications. Even when a credential is verified, circumstances can change that can affect the status of the credential, contrary to the initial verification.

BRIEF SUMMARY

In one embodiment, a method for recurring presentation of a credential includes sending a credential presentation subscription request from a subscriber to a holder, wherein the credential presentation subscription request defines a credential presentation subscription, including at least one credential of the holder and at least one subscription condition, communicating the credential presentation subscription request to the holder, determining if the holder consents to the credential presentation subscription, recording the credential presentation subscription if the holder consents to the credential presentation subscription, and automatically presenting the at least one credential of the holder in accordance with the at least one subscription condition without additional consent from the holder.

Features that are described and/or illustrated with respect to one embodiment may be used in the same way or in a similar way in one or more other embodiments and/or in combination with or instead of the features of the other embodiments.

The descriptions of the invention do not limit the words used in the claims in any way or the scope of the claims or invention. The words used in the claims have all of their full ordinary meanings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention. It will be appreciated that illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

FIG. 6 depicts an exemplary credential, showing exemplary content.

FIG. 8 is a flowchart showing exemplary steps associated with credential issuance and storage processes.

FIG. 9 is a block diagram of a system depicting exemplary components, communications and data movement associated with credential issuance and storage processes.

FIG. 10 is a flowchart showing exemplary steps associated with credential presentation processes.

FIG. 11 is a block diagram of a system depicting exemplary components, communications and data movement associated with credential presentation processes.

FIG. 12 is a flowchart showing exemplary steps associated with credential subscription request processes.

FIG. 13 is a block diagram of a system depicting exemplary components, communications and data movement associated with credential subscription request processes.

FIG. 18 is a flowchart showing exemplary steps associated with credential issuance and revocation processes.

FIG. 19 is a block diagram of a system depicting exemplary components, communications and data movement associated with credential issuance and revocation processes.

FIG. 20 is a flowchart showing exemplary steps associated with configurable requisite collection establishment processes.

FIG. 21 is a block diagram of a system depicting exemplary components, communications and data movement associated with configurable requisite collection establishment processes.

FIG. 22 is a flowchart showing exemplary steps associated with configurable requisite collection verification processes.

FIG. 23 is a flowchart showing exemplary steps associated with digitally verified resume creation processes.

FIG. 24 is a block diagram of a system depicting exemplary components, communications and data movement associated with digitally verified resume creation processes.

FIG. 33 shows an exemplary screenshot of a user interface displayed on an exemplary computer displaying credential details.

DETAILED DESCRIPTION

Figure 1:
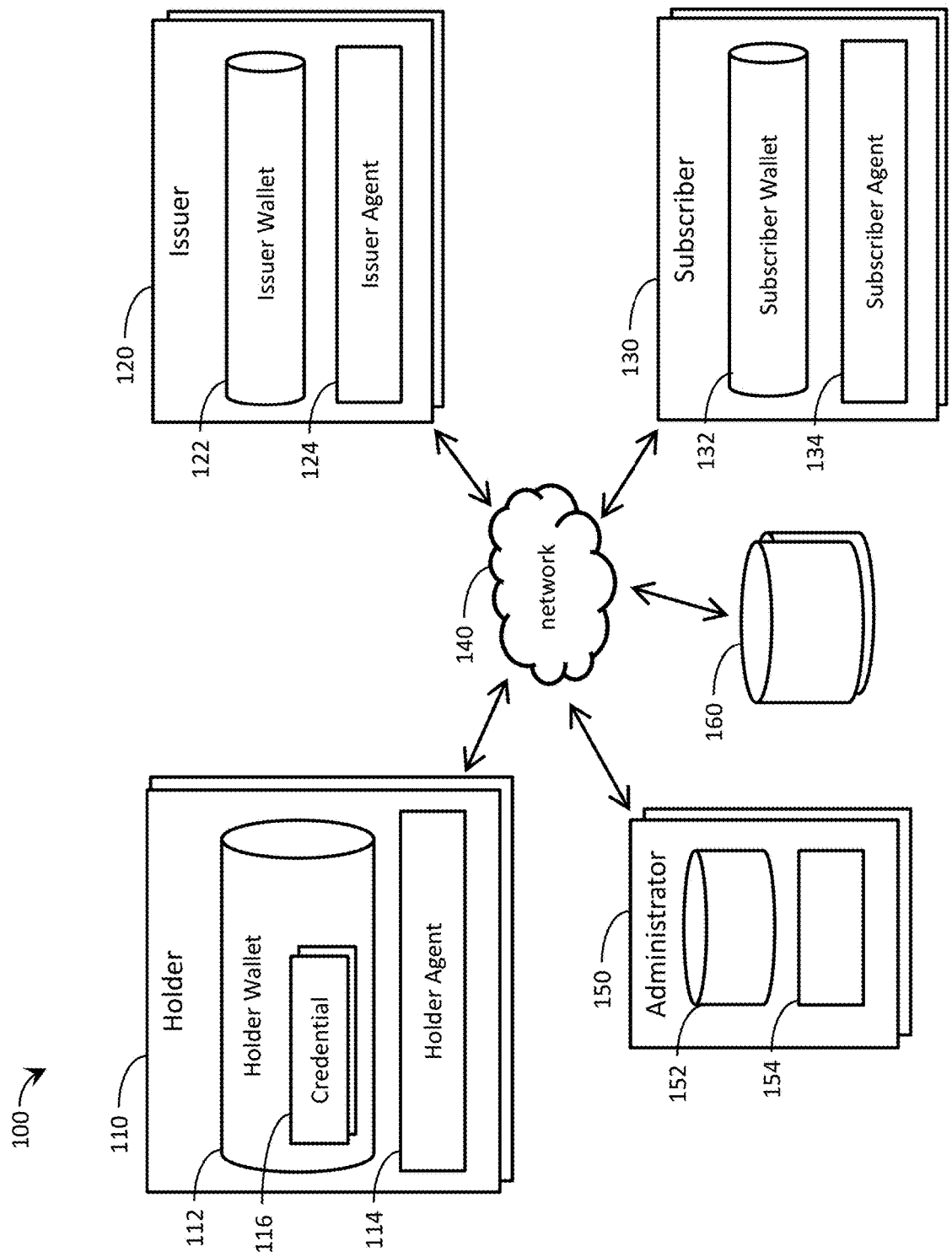
FIG. 1 is a block diagram depicting an exemplary system showing components and the actors or users that can be involved in the assertion of credentials.

The following includes definitions of exemplary terms that may be used throughout the disclosure. Both singular and plural forms of all terms fall within each meaning.

A "Blockchain," as used herein, is an immutable digital ledger of transactions that is maintained across several computers which are linked in a peer to peer network. Transactions can be grouped and ordered into blocks using a consensus mechanism that allows for perfect synchronization across all computers in the network. Each block contains a cryptographic hash of the previous block, a timestamp, and transaction data.

"Component," as used herein can be defined as a portion of hardware, a portion of software, or a combination thereof. A portion of hardware can include at least a processor and a portion of memory, wherein the memory includes an instruction to execute. A component may be associated with a device.

"Logic," synonymous with "circuit" as used herein, includes but is not limited to hardware, firmware, software and/or combinations of each to perform a function(s) or an action(s). For example, based on a desired application or needs, logic may include a software-controlled microprocessor, discrete logic such as an application specific integrated circuit (ASIC), or other programmed logic device and/or controller. Logic may also be fully embodied as software.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software", as used herein, includes but is not limited to one or more computer readable and/or executable instructions that cause a computer, processor, logic, and/or other electronic device to perform functions, actions, and/or behave in a desired manner. The instructions may be embodied in various forms such as routines, algorithms, modules, or programs including separate applications or code from dynamically linked sources or libraries. Instances of software, including those operating as an agent, can be configured and communicate in a variety of ways, including, for example, using client/server, multi-tenancy, and/or multi-instance architectures.

While the above exemplary definitions have been provided, it is Applicant's general intention that the broadest reasonable interpretation consistent with this specification be used for these and other terms.

The following flow charts and block diagrams illustrate exemplary configurations and methodologies associated with verifying assertions of credentials in accordance with the systems and methods described below. The exemplary methodologies may be carried out in logic, software, hardware, or combinations thereof. In addition, although the procedures and methods may be presented in an order, the steps may be performed in different orders, including series and/or parallel. Further, additional steps or fewer steps may be used in various other embodiments.

FIG. 1 is a block diagram depicting an exemplary ecosystem or system 100 showing components and actors or users that can be involved in the assertion of credentials, which can include verification, management, presentation, etc. of one or more credentials or related aspects. A holder 110, which can also be referred to as an asserter (who in some instances can also be a prover, e.g., consistent with some open-source blockchain verifiable data registry technologies), is a credential owner that can prove and disclose or partially disclose one or more credential(s) 116 to a subscriber 130. An issuer 120, which can also be referred to as a verifier, is a trustworthy source that provides (issues) credential(s) 116 to the holder 110. The subscriber 130, which can be, for example, an employer or prospective employer in various embodiments, is a party that wants to check that the holder 110 has some credential(s) 116 provided by an issuer 120 and who can request and verify that the holder 110 owns the credential 116. An administrator 150 can control and manage various aspects of the systems and methods described herein, as described in detail below. Various communications and signals can be sent between the holder 110, issuer 120, subscriber 130, and administrator 150 via one or more network(s) 140, which can include any type of suitable network, including, for example, the internet.

The holder 110, issuer 120, and subscriber 130 may also have an associated holder wallet 112, issuer wallet 122, and subscriber wallet 132, respectively, which can include an encrypted database containing, for example, secret keys, contact identifiers, credentials, securely transmitted messages, etc., as described in more detail below. The holder 110, issuer 120, and subscriber 130 may also utilize an associated holder agent 114, issuer agent 124, and subscriber agent 134, respectively. The agent can be responsible for the exchange of messages with other agents, can have access to the actor's wallet, can communication with one or more ledgers, and can operate on behalf of the actor. Various embodiments of an agent include a web-service, an email based agent, other computer or software-based techniques, etc. These agents 114, 124, 134 can be configured as multiple instances of a program cooperatively operating within the system 100. Agents 114, 124, 134 can provide for the functionality of the processes described herein, including the logic and/or configurations needed to operate with the system 100, which includes communicating messages and/or data with other system components (e.g., devices, storage, etc.), actors (via their devices), administrators, etc., including via other agents. Agents can communicate with an agent administrator (described in detail below) for initial set-up, updates, communications to support the processes described herein, centralized tasks, centralized storage, etc.

A credential 116 comprises a digital document granted to the holder 110 by the issuer 120 that contains claims (e.g., a set of assertions made) about the holder 110. The credential 116 can contain a cryptographic proof, such as, for example, a digital signature, from the issuer 120 (so as to be cryptographically verifiable).

Cryptography is the study and practice of secure communication techniques with an emphasis on the integrity of transmitted data as well as the secrecy. Public-key cryptography, or asymmetric cryptography, is a cryptographic system that uses pairs of keys: public keys which may be disseminated widely (e.g., published to a verifiable data registry, as discussed in detail below); and private keys which are known only to the owner (e.g., stored in a wallet). A digital signature is a mathematical technique used to validate the authenticity and integrity of a message, software, or digital document within the context of public-key cryptography.

A cryptographic proof includes a transmitted value or set of values that allows a prover to convince a verifier that the prover 'knows' something. In cryptography, the creator of the proof can be referred to as the prover. In various embodiments, one or more of the actors can be a prover or a verifier (e.g., in various embodiments, an issuer 120 or a holder 110 can take the role of a prover depending on the set of messages exchanged). Regarding digital signatures, the prover can use the value of the digital signature to prove to the verifier that the prover is in possession of a specific private key for which the public key is known. Digital signatures can be the cryptographic proofs used during credential issuance. In cryptography, a zero-knowledge proof or zero-knowledge protocol is a method by which one party (the prover) can prove to another party (the verifier) that they know a value x, without conveying any information apart from the fact that they know the value x. This is the cryptographic proof used during credential presentation.

Cryptographic verification includes the use of mathematical schemes for verification of the claims of a cryptographic proof. In the case of digital signatures, verifying the authenticity of the source of a digital document or message with the help of an accompanying public key. A complex crypto structure is a hierarchical data structure with one or many values that can be used in cryptographic verification (e.g., a proof, a public key, signature). For example, in some public-key cryptography schemes, the public key can be group of many values. A cryptographically verifiable attribute is an attribute within the credential for which it is cryptographically verifiable that it has been issued by the creator of the credential definition (i.e., it has been signed by the owner of the accompanying private key that it is associated with within the credential definition). For example, in a credential definition, discussed in more detail below, a separate public key is specified along with each attribute from the accompanying schema. The issuer 120 is in possession of all accompanying private keys. When issuing a credential, the issuer 120 includes digital signatures for each attribute with the key corresponding to the attribute from the credential schema. The credential 116 can be presented to a subscriber 130 to reveal all attributes or a partial set of attributes of the credential 116. A credential schema comprises a list of attribute names in a credential 116.

A presentation of a credential 116 comprises a cryptographic proof presented to the subscriber 130 by the holder 110. The presentation can reveal the attributes of the credential 116 that the holder 110 chooses to reveal, along with one or more cryptographic proofs of, for example: validity—the credential 116 has been digitally signed by the issuer 120; non-revocation—the credential 116 has not been revoked by the issuer 120; and/or ownership—the credential 116 has been issued specifically to the holder 110. In some embodiments, all three of these proofs can be provided with the credential. In some cases the credential is shared within the presentation; in other cases a proof of ownership of the credential is shared by the holder 110.

In this manner, the systems and methods described herein can provide a proof network that connects issuers 120, holders 110, and subscribers 130, including within a real-time or near real-time marketplace. Each of these actors can have an interest in one or more credentials 116 of the holder 110. The marketplace can include the exchange of fees for services, including, for example, fees associated with credential issuance, credential presentation, credential revocation, credential subscriptions, proofs, management, etc.

In various embodiments, the exemplary terms, constructs, entities, etc. in the following paragraphs may also be utilized. Credential values can include values of a credential schema's attributes corresponding to a specific holder 110 (integers). A credential signature can comprise an issuer's signature over credential values. Issuer keys (public) can contain two parts: one for signing primary credentials (credential values) and a second for signing a non-revocation part of the credential 116, where these keys can be used to prove that a credential 116 was issued and has not been revoked by the issuer 120. Issuer keys can be uniquely identifiable and accessible by various or all parties. To support a later revocation, an issuer 120, while issuing a credential 116, can embed a special attribute, for example, a revocation id/index in the credential 116. To revoke the credential 116, the issuer 120 can publish (e.g., to network via a registry via the network, as discussed below) that a credential 116 with a particular ID is revoked. An accumulator can include a data structure that can be used to hold the ids of non-revoked credentials 116. While issuing a credential 116, an issuer 120 can add the revocation ID to the accumulator and, while revoking that credential 116, the issuer 120 can remove that credential's ID from the accumulator. In some embodiments, since an accumulator may hold only a fixed number of elements, multiple accumulators can be used by the issuer 120. A witness can be data required by the holder 110 to prove that a particular credential 116 is not revoked (i.e., that the credential ID is present in the accumulator). The holder's witness should be updated each time a credential 116 is revoked. The holder can calculate the updated witness using already published data (known as the tails file) by the issuer 120 as well as the witness delta—a value that can be published by the issuer 120 each time it publishes an update to the accumulator. The tails files don't change with the accumulator. A revocation registry can contain revocation keys, accumulators, and accumulator tails. The public part of the revocation registry can be published by the issuer 120 on a verifiable data registry storage 160 that can be tamper-evident and highly available (e.g., a blockchain, Amazon QLDB, Google Trillian, etc.), which can be used to prove that a credential 116 hasn't been revoked. High availability refers to a system that has relatively high uptime. Downtime is time where the storage is unavailable and would prevent access and execution of related process, for example, subscribers 130 from completing verification.

In various embodiments, a master secret can comprise a secret key encoded in a credential 116 that is used to prove that the holder 110 owns the credential 116. A holder 110 can blind the master secret and give it to the issuer 120, who can then encode this blinded secret in the credential 116. The objective of blinding the master secret is to prevent the identity leak of the holder 110 even if the issuer 120 and subscriber 130 collude. A predicate is a condition that can be met, for example, within the context of a credential presentation. For e.g. a presentation can include a zero knowledge proof that proves that the value of an attribute (x) within a credential they possess is greater than another value (y). The presentation can prove this predicate (x>y) without disclosing the value of x. In various embodiments, the subscriber 130 can either ask the holder 110 to reveal the attributes or satisfy some predicate over the attribute.

In various embodiments, a proof can be a complex crypto structure created by the holder 110 over multiple credentials 116 that allows the holder 110 to prove that: holder 110 can electronically compare and confirm the signature of credential 116 containing the unique issuer key (identified by key id); the credential 116 contains attributes with specific values that holder 110 discloses; and/or the credential 116 contains attributes with valid predicates that the subscriber 130 requires the holder 110 to satisfy. In one embodiment, a subscriber can make a sub-proof request to a holder to create a proof from a specific credential 116 and can contain attributes to be revealed and predicates to be satisfied. A proof can be composed of several sub-proofs.

The system may also include one or more administrator(s) 150. In some embodiments, an administrator 150 can control and manage various aspects of the systems and methods described herein. In other embodiments, an administrator 150 can perform various delegated and/or general tasks and/or act as a proxy for one or more actors. For example, the one or more administrators 150 can be responsible for user onboarding and management (including, e.g., providing for the distribution and support of agents 114, 124, 134 to actors and/or other administrators), configurable requisite collection management and calculation, enterprise onboarding, automated credential verification, automated credential issuance, and any other centralized or suitable tasks, including various administrative processes described below. In various embodiments, administrators 150 may be automated process, one or more individual(s) using administrative tools, and/or dashboards or a combination of both. Administrators 150 may have access to one or more agents 114, 124, 134 and/or wallets 112, 122, 132. In some embodiments, the administrator may also include one or more agents or other tools, logic, modules, etc. 154 that can interface with actor agents 114, 124, 134. Administrators 150 can also include one or more storages 152. In general, one or more exemplary administrator(s) 150 can manage the system, including applying settings and variables, facilitating communications/messages, controlling processes, etc. and/or act on behalf of or with an actor. The administrator 150 can execute various processes described herein, including administrative processes, such as, for example, transactional, scoring, rating, and fee-related services.

Access to and interfacing with the system 100 by the holder 110, issuer 120, subscriber 130 and/or administrator 150 may be via or embodied in any appropriate device, including various computing devices, such as computers, tablets, smart phones, and other device capable of providing an appropriate user interface and software, as discussed in more detail below. For example, references to holder 110, issuer 120, and/or subscriber 130 include embodiments where a user acting as the holder 110, issuer 120, and/or subscriber 130 utilizes one or more devices depicted as the holder 110, issuer 120, and/or subscriber 130. Wallets 112, 122, 132 may be stored locally, remotely, separately, collectively, or in any manner allowing association with the respective holder 110, issuer 120, and subscriber 130. In some embodiments, data in a wallet 112, 122, 132 may be stored in a memory component of the respective holder 110, issuer 120, and/or subscriber 130 devices. In some embodiments, data in a wallet 112, 122, 132 may be stored in different locations but still associated with the same respective wallet. Agents 114, 124, 134 may reside locally, remotely, or in any manner that provides communication/services operating on behalf of the respective holder 110, issuer 120, and subscriber 130. Agents 114, 124, 134 can be instances of software stored in memory components of and/or operating on the respective holder 110, issuer 120, and/or subscriber 130 devices. The holder 110, issuer 120, and/or subscriber 130 devices can also include suitable network interface components and/or modules for interfacing with other devices 110, 120, 130, 150, 160 via network 140 and for any other communications, data processing, etc.

As is discussed in more detail below, various embodiments of the systems and methods provide the ability for users to track the lifecycle and conditional rules associated with digitally verified third-party assertions and verifications of credentials, provenance, authenticity, outcomes, ingredients, etc. through a network of certified and optionally rated issuers 120. The system provides an auditable cryptographic mechanism for issuers 120 to digitally sign the credentials 116 they grant, providing a means for subscribers 130 to confirm the authenticity and integrity of credentials 116 that are later provided to them by holders 110. The digital wallets 112, 122, 132 associated with the system allow, for example, holders 110 to manage and track the status of their credentials 116 via, for example, a web browser and/or an app via a mobile device (e.g., via an agent). Additionally, in some embodiments, the system enables subscribers 130 to monitor and detect whenever a credential 116 becomes invalid, for example, by expiration, suspension, or revocation by an issuer 120. As such, the systems and methods can prevent a recorded status or score of a verification instance to be modified or deleted, thereby providing a permanent and immutable record, for example, in a distributed electronic ledger, as discussed below.

Various exemplary embodiments comprise a directory or database that stores and manages user and organization accounts, security keys, roles, privileges, digital wallets, etc. This database can be stored in an administrative storage/memory 152, in the wallets 112, 122, 132 of the respective actors/remote devices 110, 120, 130, and/or in any other suitable storage device.

At least one verifiable data registry storage 160 is available via the network 140. As mentioned above, storage 160 can be tamper-evident and highly available for use by various actors in the system 100, as discussed in the various embodiments below. One example of a verifiable data registry 160 is a blockchain, as defined above. References to storage 160 include embodiments where more than one storage 160 is used. In some embodiments, administrator 150 or another location/device may also include memory and/or storage 152 that can store various data associated with the systems and methods described herein, including, for example, a transaction ledger, as discussed in more detail below. Access to all storage (including, for example, 112, 122, 132, 152, 160) can be controlled and limited to authorized users. Different instances of storage, including all of those mentioned above, can utilize different configuration models. For example, various data can be stored to storage 160 using different verifiable data registries, for example, including different blockchain models, standards, configurations, access, etc.

In various embodiments, one or more agents 114, 124, 134 of a system operate cooperatively via network 140 to execute methods described herein, utilizing wallets/storage 112, 122, 132, 152, 160 as necessary. Various embodiments can include one or more holders 110, issuers 120, subscribers 130, and/or administrators 150.

As discussed in more detail below, in various embodiments, the system 100 is provided for establishing and managing business terms, policies, transactions, and/or fees related to verified credentials and corresponding payments between actors/parties 110, 120, 130, 150, including, for example, those that make assertions (e.g., holders 110), those that verify assertions (issuers 120), and those that subscribe and possibly pay for access to the information (e.g., subscribers 130). In various embodiments, the system 100 may also establish and manage the lifecycles of proofs and/or credentials 116, including, for example, expirations, dependencies, prerequisites, etc. Exemplary embodiments may comprise a system for scoring issuer 120 accuracy over time, for example, based on subscriber 130 input and/or peer consensus. Exemplary embodiments also comprise an interface (e.g. automated) to (public and/or private) verifiable data registries 160, other storage devices, administrative storage 152, IoT devices, verification agencies, document interfaces, etc. In an exemplary embodiment, the system 100 can provide a process by which a token, for example, of monetary value or fiat-based currency, can be paid from a central electronic treasury or third party, for example, to an issuer 120 in exchange for issuing/verification services. In an exemplary embodiment, verification tokens are stored in the issuer wallet 122 belonging to the issuer 120. These and other features can be combined in various embodiments, including as discussed in more detail below.

Figure 2:
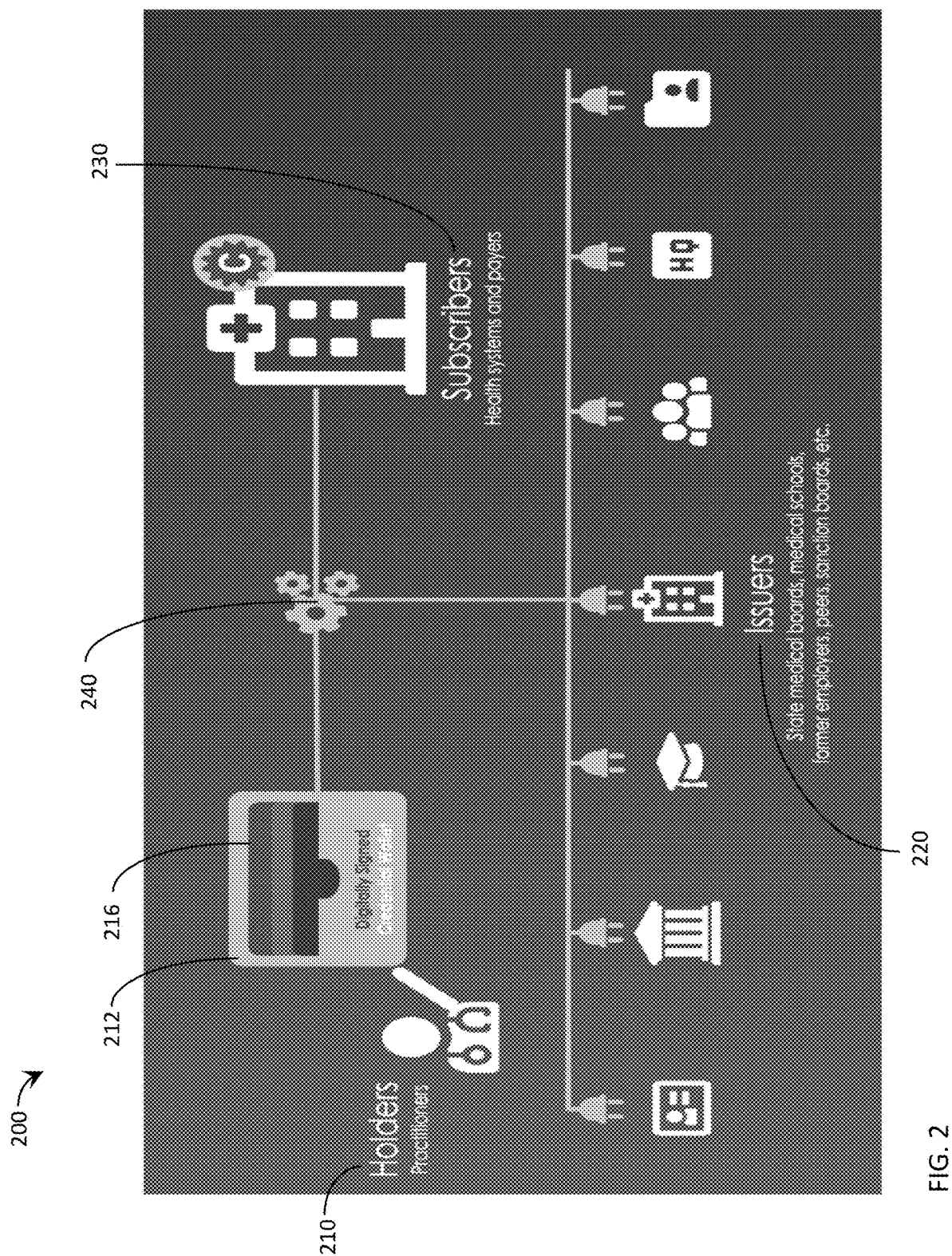
FIG. 2 shows an exemplary medical field ecosystem embodiment showing the actors that can be involved in the assertion of credentials.

In one embodiment, as shown in FIG. 2, the system and methods can be utilized in an exemplary medical field ecosystem 200. A holder 210 can be a medical practitioner, who can prove and disclose or partially disclose one or more credential(s) 216 to a subscriber 230, which can be, for example, a health system or payer. The holder 210 is shown with an associated holder wallet 212, which contains the holder credential(s) 216. An issuer 220, which can also be, for example, a state medical board, medical school, former employer, peer, sanction board, etc., can provide (issue) verified credential(s) 216 to the holder 210. The subscriber 230, which can also be an employer or prospective employer in various embodiments, is a party that wants to check that the holder 210 has some credential(s) 216 provided by the issuer 220. Various communications and signals can be sent between the holder(s) 210, issuer(s) 220, and/or subscriber(s) 230 via network 240, which may include any type of suitable network as described above, including, for example, the internet. The holder(s) 210, issuer(s) 220, and subscriber(s) 230 may also each have an associated wallet and agent (not shown), as described above.

In this embodiment, the system provides a means that allows issuers 220 (e.g., license agencies, medical schools, former employers, etc.) to issue electronic credentials to holders 210 (e.g. practitioners, such as clinicians, nurses, doctors, etc.). The holders 210 can then can grant access to one or more of their credentials to subscribers 230 (e.g. employers, health systems, etc.), for example, to satisfy state, federal, health plan, and/or standards-body requirements for credentialing (e.g., TJC, NCQA, URAC, etc.).

Although references to the medical field are used in various examples below, the systems and methods included herein are applicable to many other fields associated with the assertion and verification of identity, credentials, provenance, authenticity, and/or performance. In particular, the systems and methods can be applicable to people, places, and/or things in many industries, including but not limited to, healthcare, financial services, professional services, transportation, manufacturing, government, social services, security, retail, etc.

Figure 4:
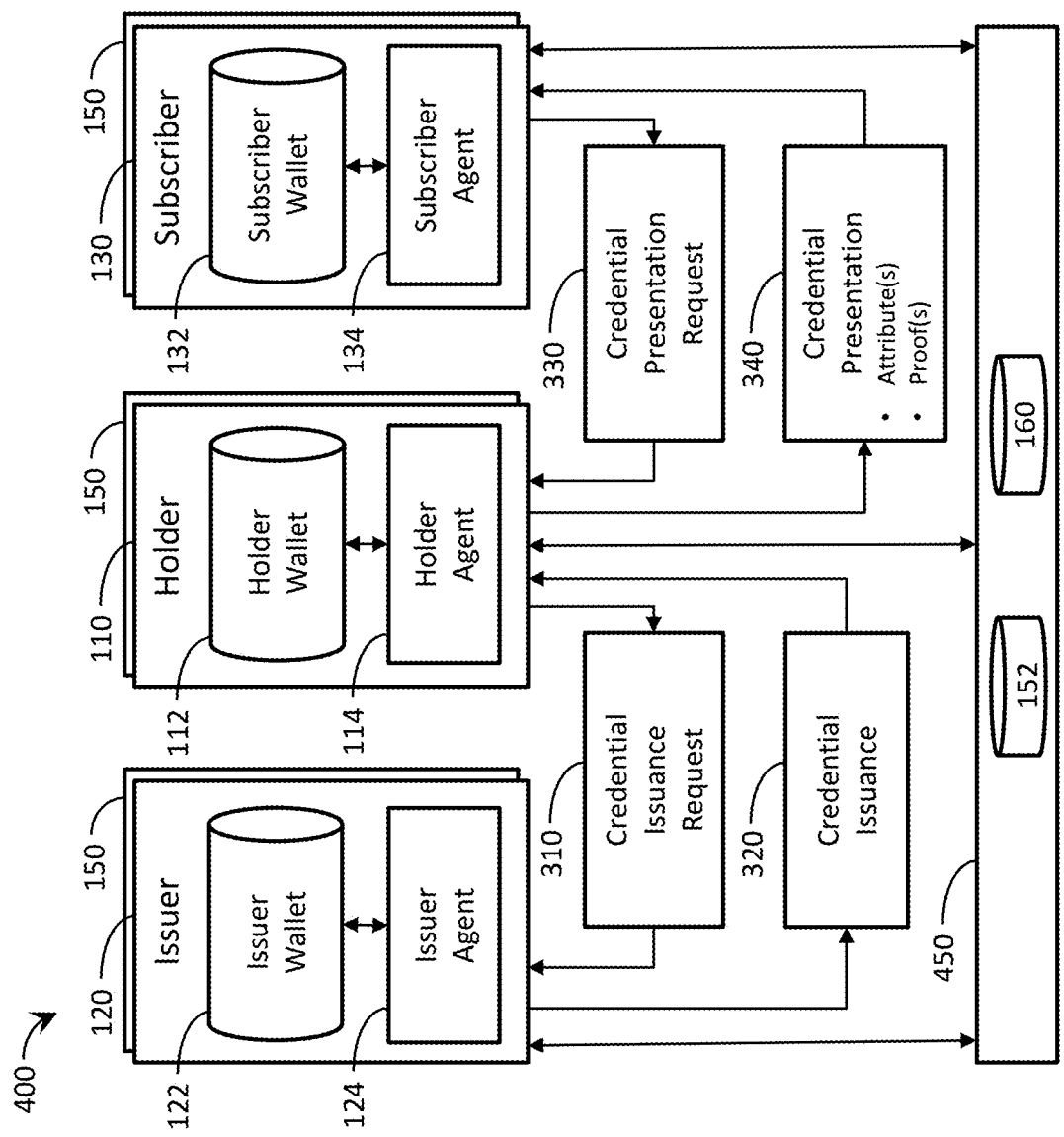
FIG. 4 a block diagram of a system depicting exemplary components, communications and data movement associated with credential issuance and presentation processes.
Figure 3:
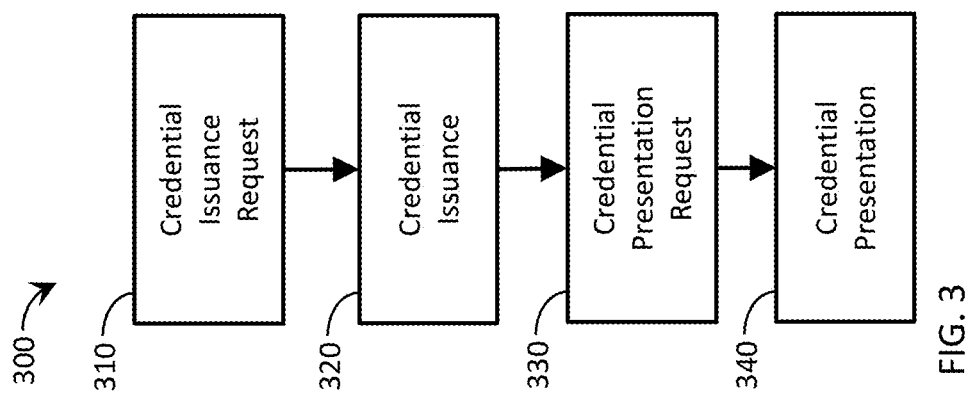
FIG. 3 is a flowchart showing exemplary steps associated with credential issuance and presentation processes.

With continued reference to FIG. 1 and also FIG. 3, which is a flowchart showing exemplary steps associated with credential issuance and presentation processes 300, and FIG. 4, which is a block diagram of a system 400 depicting exemplary components, communications and data movement associated with the processes 300. In this embodiment, at step 310, the holder 110 can request (e.g., via the holder agent 114) that an issuer issue a credential 116 to the holder 110. Next, at step 320, the issuer 120 can issue (e.g., via the issuer agent 124) the credential 116 to the holder 110. The credential 116 can be stored in the holder wallet 112. At step 330, a subscriber 130 can request (e.g., via the subscriber agent 134) the credential 116 from the holder 110. Then, at step 340, the holder 110 can present (e.g., via the holder agent 114) the credential 116 revealing all attributes or a partial set of attributes to the subscriber 130. The various communications and signals can be sent between the holder 110, issuer 120, and/or subscriber 130 via network 140, by interfacing agents 114, 124, 134, respectively. Storage 450 can include various types of storage, including, for example, a general or administrative storage 152, as described above, a verifiable data registry 160, as described above, etc. and in more detail below, any other storage needed to facilitate the associated processes, etc. Records of transactions may be stored, for example, on storage 152, including via a transaction ledger and data that may be subject to subsequent verification may be stored/registered, for example, on storage 160. FIG. 4 also shows administrators 150, as mentioned above, which can act on behalf of or as proxies for one or more actors 110, 120, 130 with various levels of delegated authority and access (e.g., to actor information, wallets, etc.) and via administrator agents. In this manner, administrators 150 can assume one or more roles of an actor 110, 120, 130 during one or more of the associated communications or processes.

It should be noted that reference to method steps and system components/actors together, here and below, is for convenience and that the processes do not require all of the system components and the systems do not require all of the method steps. Various embodiments of methods and systems can each include more or less method steps and/or system components.

In other embodiments, various processes can include more or less steps associated with related processes. For example, a credential presentation request 330 can occur separate from a credential issuance request 310. In another example, a credential offer from an issuer 120 to a holder 110 can replace the credential issuance request step 310. In this embodiment, the response from the holder 110 may be an acceptance rather than a request.

Generally, a credential 116 includes proof of an assertion by a holder 120. The credential 116 presented to the subscriber 130 at step 340 can include a cryptographic proof that reveals the attributes of the credential(s) 116 that the holder 110 chooses to reveal, along with cryptographic proofs of validity, non-revocation, and ownership, as discussed above and in more detail below. Revocation by the issuer 120 can be checked against a revocation registry, for example, stored on verifiable data registry 160. As discussed in more detail below, verifiable data registry 160 (e.g., a blockchain) includes a verifiable data registry that can maintain, for example, decentralized identifiers, credential schemas, credential definitions, revocation registries, etc., as discussed below. For example, various information can be stored and/or referenced on the verifiable data registry 160 in several ways, including, for example: issuers 120 can define a credential schema, define credential definitions, and maintain revocation registries, as described in more detail below; holders 110 can register identifiers and read from the revocation registry; and subscribers 130 can verify issuer 120 signatures and check credential definitions against schemas.

Figure 5:
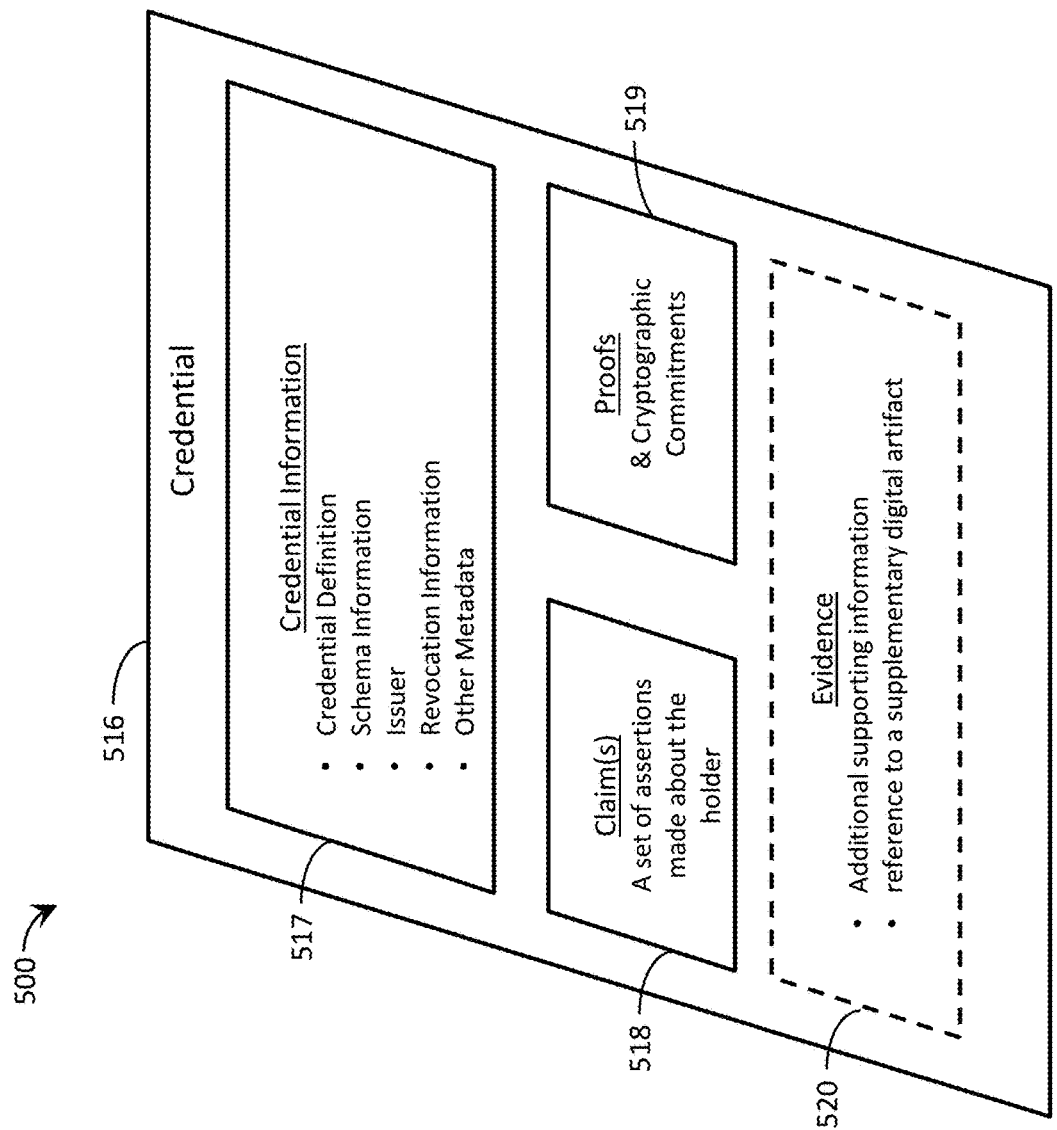
FIG. 5 depicts an exemplary credential, showing exemplary components.

FIG. 5 depicts an exemplary credential 516, which can be credential 116 described above. Credential 516 can include several components, for example, credential information 517, one or more claim 518, proofs 519, and evidence 520. Credential information 517 can include information such as credential definition (e.g., holder name & ID), schema information, issuer 120, revocation information (e.g., revocation registration IDs and credential revocation IDs), other metadata relevant to the credential 516, etc. Claim 518 can include a set of assertions made about the holder 110. Proofs 519 can include cryptographic proofs (e.g., digital signature) as discussed in detail above. Credential 516 can optionally include evidence 520, which can contain additional supporting information and/or a reference to a supplementary digital artifact (e.g., .pdf file, screenshot/screen capture, etc.) relevant to a credential's claims 518. It should be noted that credentials are digital constructs and can be configured, stored, and/or depicted in any number of ways.

FIG. 6 depicts an exemplary credential 616, showing some exemplary content associated with the components described above. Credential 616 includes credential information 617, claim 618, and proofs 619. Here, credential 616 contains digital information 617, 618, 619, which collectively proves that Dr. Mary has a particular bachelor degree.

Proofs 519 refer to the cryptographic verification of the credential 516, which can be used to ensure proper authorship of the credential 516 and to detect tampering. What makes credentials 516 (and their associated presentation, e.g., as shown above as credential presentation 340) verifiable is their inclusion of a proof 519. Without a proof 519, a subscriber 130 cannot verify the credential's validity. Verification of a credential 516 (or credential presentation) involves checking for the presence of a proof 519 within or along with the credential 516 (or credential proof (CP)) and then checking its validity, non-revocation, and/or ownership. This verification involves referring to the information related to the credential 516 that is stored, for example, on the verifiable data registry 160. For example, regarding proofs of validity and ownership, to check the validity (i.e., that the credential 516 has been digitally signed by the issuer 120) and ownership (i.e., that the credential 516 has been issued specifically to the holder 110 (creator of this proof 519)), the credential schema and credential definition can be checked. In another example, regarding proofs of non-revocation, a revocation registry, for example, stored on storage 160, can be checked.

Regarding utilization of the verifiable data registry 160 (which, as mentioned above, may be a blockchain in several embodiments), a goal with the disclosed methods and systems involves a trust model to allow for a private peer-to-peer exchange of credentials 516 (in contrast to conventional models with centralized, federated, and/or hub-and-spoke model exchanges) where individual holders 110 can own and control their own set of credentials 516. Use of a verifiable data registry 160 can facilitate this exchange between issuers 120, holders 110, and subscribers 130 by serving as the publicly readable and verifiable data registry of decentralized identifiers, credential schema, credential definitions, and/or the revocation registry and is a tamper-resistant and trusted store of this information.

Figure 7A:
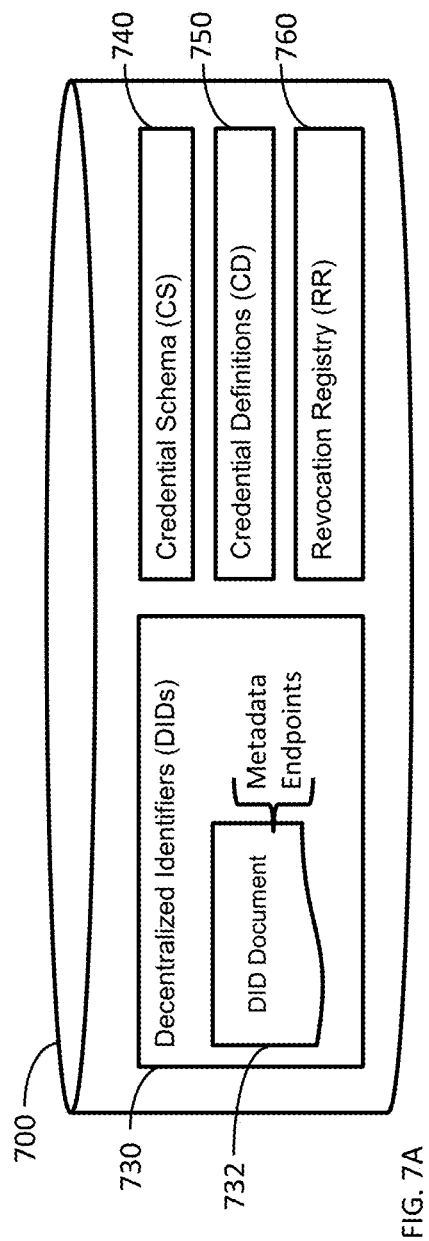
FIG. 7A depicts an exemplary configuration and components of an exemplary verifiable data registry.

A verifiable data registry 160 may be configured in any manner suitable to achieve the requirements mentioned above. In one embodiment, FIG. 7A depicts an exemplary configuration and content/components of a verifiable data registry 160 embodied in an exemplary database/datastore 700. For example, database/datastore 700 is shown with exemplary decentralized identifiers (DIDs) 730, including actor identifiers which are used to establish cryptographically-verifiable digital identities of actors (e.g., various holders 110, issuers 120, subscribers 130), who can control their own DIDs. DIDs can tie to a DID document 732 (e.g., a JavaScript Object Notation for Linked Data (JSON-LD) file or other comparable structured data format) that can contain: metadata needed to prove ownership and control of a DID as well as share the cryptographic keys; and endpoints which are necessary to initiate communication between actors and point to the actors' agents (e.g., various holder agents 114, issuer agents 124, subscriber agents 134). The endpoint is the network address the identity holder uses for further communication, such as a URL or an IP address. It enables two identity holders to communicate directly with one another in a private, secure peer-to-peer interaction, DID-to-DID, with no intermediaries.

Credential schema (CS) 740 are a set of attribute data types and formats that are used for claim 518 of a credential 516 and can be used by issuers 120 issuing credentials 516 (to standardize credential issuance across issuers 120) in addition to providing subscribers 130 sufficient information to determine if a given credential 516 is well-formed and in adherence to the relevant CS. A CS can describe a credential 516 by listing the attributes within it. For example, in one embodiment, a CS could describe a university diploma and include definitions of its attributes, including, for example, the university, graduation year, GPA, degree, other relevant fields, etc.

Credential definitions (CD) are instances of credential schema in addition to the attribute-specific public verification keys that are bound to the private signing keys of an individual actor. This approach enables an issuer 120 to re-use an existing CS and enables a subscriber 130 who receives a proof containing data from the issuer 120 to look up the issuer's CD on the verifiable data registry 160, obtain their verification key(s), and verify the origin and integrity of that data. For example, MIT, Harvard, Stanford, and other individual universities could all implement a university diploma CS. Even though these universities can all implement the same CS, the credentials 516 issued by them are semantically different (e.g., a Stanford diploma is different than a Harvard diploma).

Revocation registry (RR) can be written to the verifiable data registry 160 by issuers 120. The RR is updated every time a credential is issued or revoked. The RR is a data structure that allows a subscriber 130 to check whether a particular credential is still currently valid. When a credential 116 is issued, the RR is updated to ensure that the non-revocation can be proved. When a credential 116 is revoked, the RR is updated to ensure that non-revocation can no longer be proved. The RR can reference the CD and cryptographic accumulator. The cryptographic accumulator is a type of compound hashing function tracking the valid credentials 516 added to and removed from the registry. Only holders 110, through proofs of non-revocation, can prove their credentials 516 are valid (not revoked) without disclosing which credential 516 is in question. For example, in one embodiment, if a university publishes a list of individuals whose diplomas have been rescinded, this would be akin to a RR.

Certain data (e.g., DIDs 730, CS 740, CD 750, RR 760) can be required on a data registry for the verifiable credential model to work satisfy the needs of the actors (e.g., for access and verification purposes). Requirements can depend on applicable standards (e.g., the W3C verifiable credential specification).

Figure 7B:
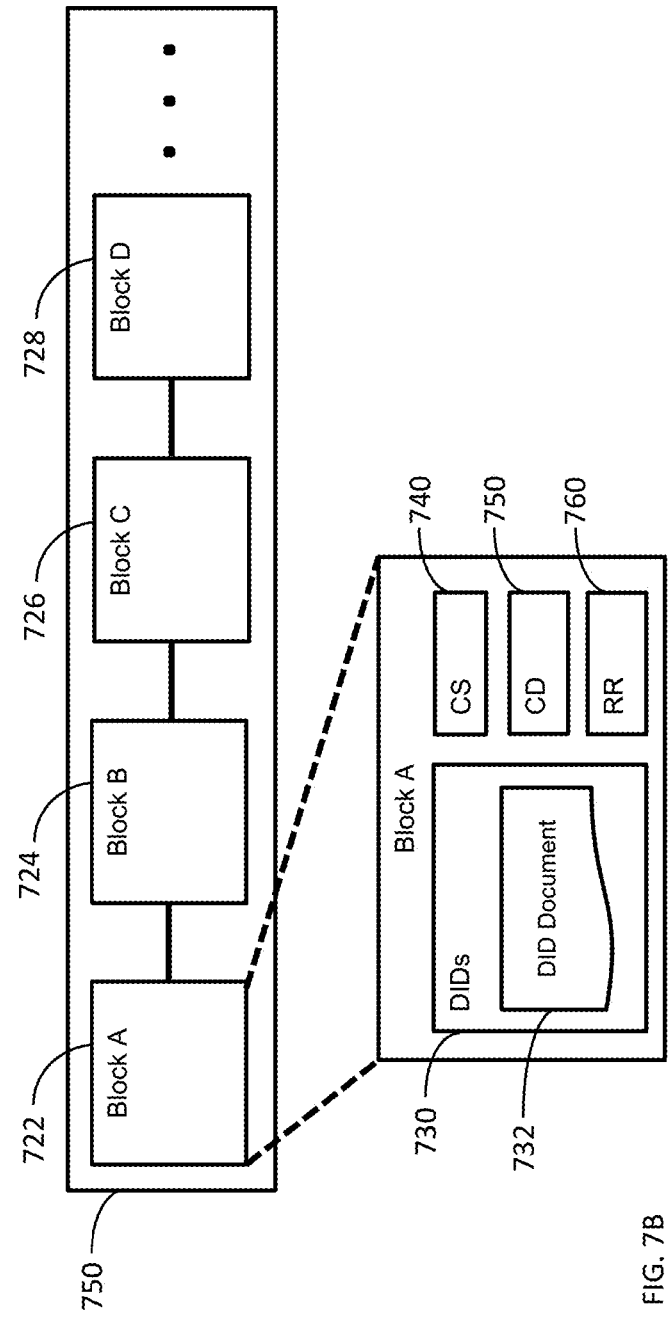
FIG. 7B depicts an exemplary configuration and components of an exemplary blockchain.

FIG. 7B depicts another exemplary configuration and content/components of storage 160 embodied in an exemplary blockchain 750. For example, Block A is shown with DIDs 730 (including DID Document 732), CS 740, CD 750, and RR 760. Blocks 722, 724, 726, 728 can include continuous posting of new and updates to data, including status of the information, stored thereon.

Agents 114, 124, 134 can facilitate communications and services on behalf of an actor (e.g., various holders 110, issuers 120, subscribers 130), as discussed above, and can have access to the actor's wallet (e.g., holder wallet 112, issuer wallet 122, subscriber wallet 132). Agents 114, 124, 134 can have the capability to transmit and receive messages to and from other agents 114, 124, 134. Agents 114, 124, 134 can use many different communication transports for transmitting and receiving messages, including, for example, HTTP(S) 1.x and 2.0, WebSockets, IRC, Bluetooth, AMQP, NFC, Signal, email, push notifications to mobile devices, ZMQ, etc. In various embodiments, agent to agent (A2A) communication is message-based and is secured by modern, best-practice public key cryptography. How messages flow over a transport can vary, but their security and privacy toolset, their links to the DIDs and DID documents of identity owners, and the ways that their messages are packaged and handled can be standardized.

Agents 114, 124, 134 can connect to one another through a standard connection protocol (e.g., connection invitation and requests are messages that are used to establish secure channels for message exchange between agents), discover one another's endpoints and keys through standard DID documents, discover one another's features in a standard way, maintain relationships in a standard way, etc. All of these points of standardization are what allows agents 114, 124, 134 to be interoperable. In various embodiments, exemplary message types can include, but are not limited to: credential requests 310, 330; credential offers; credential presentations 340; connection invitations/requests, which can be used to establish a connection between agents, etc.

Wallets 112, 122, 132 can include an encrypted database containing: credentials 116; identifiers (DIDs); securely transmitted messages; and/or secret keys. For example, in public key cryptography, two keys are used: one key is used for encryption; and the other is used for decryption. In public key cryptography, one of the two keys is kept as a secret. In private key cryptography, the key is kept as a secret. An actor's wallet 112, 122, 132 can be accessed by the actor's agent 114, 124, 134 to facilitate any of the processes described herein. An actor's wallet 112, 122, 132 can be stored in a variety of places, including, for example, in the cloud, on personal devices (mobile, workstation, etc.), any combination of personal device and cloud, on shared devices, in federated instances, further combinations thereof, etc.

In this manner, the integrated system 400 and exemplary methods/processes 300 can utilize rule-based logic and a verifiable data registry 160 to manage and determine the validity of assertions made by holders 110 by referencing subsequent verification by other authorized third party issuers 120, conditions of time, dependencies, and/or prerequisites, in the form of credentials 116.

In one embodiment, with continued reference to FIG. 1 and also FIG. 8, which is a flowchart showing exemplary steps associated with credential issuance and storage processes 800, and FIG. 9, which is a block diagram of a system 900 depicting exemplary components, communications and data movement associated with the processes 800. In this embodiment, at step 810, an issuer 920 creates a credential offer (e.g., via the holder agent 924) based on a CD 962 (e.g., on the verifiable data registry 160) after establishing a secure connection with a holder 910. Next, at step 820, the holder 910 sends a credential (issuance) request message (e.g., via the holder agent 914) to the issuer 920 requesting the issuance of the credential 916 based on the description sent in the issuer's credential offer at 810. Then, at step 830, in response to the credential request from the holder 910 at 820, the issuer 920 sends a credential issuance message back to the holder 910 that contains the verifiable credential 916 as an attached payload, which the holder 910 can store in their holder wallet 912 for future use. As described above, the various communications and signals can be sent between the holder 910 and issuer 920 via network 140, by interfacing agents 914, 924, and utilizing wallets 912, 922, respectively, and the relevant information stored and/or referenced on storage 950. As defined above, storage 950 can include various types of storage, including, for example, a general or administrative storage 152, a verifiable data registry 160, any other storage needed to facilitate the associated processes, etc. Records of transactions may be stored, for example, on storage 152, including via a transaction ledger and data that may be subject to subsequent verification may be stored/registered, for example, on storage 160. FIG. 9 (and FIG. 11) also shows administrators 150, as mentioned above, which can act on behalf of or as proxies for one or more actors 910, 920, 930 with various levels of delegated authority and access (e.g., to actor information, wallets, etc.) and via administrator agents. In this manner, administrators 150 can assume one or more roles of an actor 910, 920, 930 during one or more of the associated communications or processes.

In one example, the system and methods can be utilized in the exemplary medical field ecosystem. For example, doctors, as exemplary holders 910, can maintain many kinds of credentials 916 in their wallets 912. These credentials 916 can come from the primary source issuers 920 of the relevant information. In one embodiment, a primary source is the American Board of Medical Specialties (ABMS) and it can issue Dr. Mary an ABMS Certification for one or more specialties. In this embodiment, this issuance of a credential process starts with a credential offer 810, where the ABMS, as the primary source issuer 920, can send a credential offer 810 of an ABMS certification credential 916 to Dr. Mary (potential holder 910, after establishing that this Dr. Mary is the relevant actor in question). Next, for a credential request 820, after receiving the credential offer from the ABMS at 810, Dr. Mary (holder 910) will request the referenced credential 916 from the ABMS (issuer 920). Then, for credential issuance 830, after receiving the credential request from Dr. Mary at 820, the ABMS will issue the referenced credential 916, specific to Dr. Mary, which Dr. Mary can subsequently maintain in her wallet 912. In another embodiment, Dr. Mary (potential holder 910) can start the process with a credential request 820 to ABMS (issuer 920), without a credential offer 810 from ABMS.

In another embodiment, a primary source is the Drug Enforcement Administration (DEA) and it can issue Dr. Mary a DEA Certification. In this embodiment, one or more administrator(s) 150 can act as a proxy for Dr. Mary (as holder 910) and/or for the DEA/NTIS, where the DEA (as the primary source issuer 920) can issue credentials via the Federal National Technical Information Services (NTIS). After establishing a relationship with Dr. Mary (e.g., via an onboarding/enrollment process) the (holder) administrator 150 for Dr. Mary can query the NTIS website/database using certain query parameters associated with Dr. Mary and can receive a response containing credential information. The administrator 150 may take additional steps to determine that Dr. Mary is the relevant actor in question. Next, for a credential request/issuance 820/830, after receiving the credential information from the DEA NTIS service (e.g., a quasi-credential offer 810), the (issuer) administrator 150 for the DEA/NTIS can create a CD 962, CS, and the referenced credential 916 on behalf of the DEA/NTIS (issuer 920). Then, Dr. Mary can subsequently maintain the credential 916 in her wallet 912. In some embodiments, the holder administrator 150 (e.g., for Dr. Mary) and the issuer administrator 150 (e.g., for the DEA/NTIS) may be the same.

In another embodiment, with continued reference to FIG. 1 and also FIG. 10, which is a flowchart showing exemplary steps associated with credential presentation processes 1000, and FIG. 11, which is a block diagram of a system 1100 depicting exemplary components, communications and data movement associated with the processes 1000. In this embodiment, at step 1010, a subscriber 930 sends a credential (presentation) request message (e.g., via the subscriber agent 914) to the holder 910 requesting the presentation of the credential 916. Then, at step 1020, in response to the credential request from the subscriber 930 at 1010, the holder 910 sends a credential presentation message back to the subscriber 930. Messages sent from the holder 910 to the subscriber 930 containing a holder's relevant credential 916 are packaged in such a way that authorship of the data is verifiable (via proof), as described above. In particular, credential presentations contain the credential 916, along with embedded proof 1119 (e.g., proving validity, non-revocation, and ownership, as described above), and credential presentation metadata 1117 (e.g., IDs, type, etc.) as an attached payload. Also as described above, the various communications and signals can be sent between the holder 910 and subscriber 930 via network 140, by interfacing agents 914, 934, and utilizing wallets 912, 932, respectively, and the relevant information stored and/or referenced on the storage 950 (e.g., CS, CD, and RR).

In one application, the system and methods can be utilized in the medical field ecosystem. For example, a hospital (doctor employer), as an exemplary subscriber 930, can request that a doctor or prospective doctor (Dr. Mary), as an exemplary holder 910, present one or more of the credentials 916 in their wallet 912. As discussed above, these credentials 916 can come from the primary source issuers 920 of the relevant information, such as, for example, the DEA. In this embodiment, the presentation of a credential process starts with a credential presentation request 1010, where the hospital (subscriber 930) will send a credential presentation request 1010 of a DEA credential 916 to Dr. Mary (holder 910). Next, for a credential presentation 1020, after receiving the credential request from the hospital at 810, Dr. Mary will present the referenced credential 916 issued by the DEA to the hospital.

FIGS. 9 and 11 also demonstrate that certain administrators 150, as mentioned above, can act as proxies for one or more actors 910, 920, 930. Although not repeated for the following embodiments, administrators 150 can act on behalf of holders, issuers, subscribers, and/or other administrators in these and other embodiments, including with various levels of delegated authority and access (e.g., to actor information, wallets, etc.) and via administrator agents.

Systems and methods can also be used for recurring credential presentations of a credential or group of credentials, including any of the credentials mentioned above. These embodiments allow for automated credential presentations while not renewing or only periodically renewing consent for the credential presentation. All of the systems and methods in these embodiments can utilize the features described above, including, for example: ecosystem 100 (and components thereof); the various actors; devices; the various systems and methods associated with credential creation, contents, configuration, issuance, requests, offers, presentations, storage, etc.; utilization of the blockchain; use of wallets; use of agents; information storage; etc.

In one embodiment, with reference to FIG. 12, which is a flowchart showing exemplary steps associated with credential subscription request processes 1200, and FIG. 13, which is a block diagram of a system 1300 depicting exemplary components, communications and data movement associated with the processes 1200. In this embodiment, at step 1210, a subscriber 1330 creates a credential presentation subscription request (e.g., via the subscriber agent 1334) and sends the credential presentation subscription request to a holder 1310. For example, a message can be sent from the subscriber agent 1334 to the holder agent 1314 referencing the credential (e.g., credential 1316) that the subscriber 1330 would like to query more than once or on an ongoing basis (i.e., per a subscription) without needing holder 1310 consent for every presentation. The credential presentation subscription request 1210 defines the credential presentation subscription, including at least one credential of the holder 1310 and at least one subscription condition, such as, for example, particular attributes of the credential, a time period before expiration or renewed consent, frequency of presentations (during the time period), etc.

Next, at step 1220, the holder agent 1314 can communicate the credential presentation subscription request to the holder 1310 and determine if the holder 1310 consents to the credential presentation subscription. For example, in one embodiment, the holder agent 1314 can present a user interface on the display of the holder device (1310) with the details of the credential presentation subscription and request a selection of "accept" or "deny" the credential presentation subscription from the holder 1310. If the holder 1310 does not consent at 1220, then the process 1200 ends at step 1225. Step 1225 may include the holder agent 1314 sending a message to the subscriber agent 1334, notifying the subscriber 1330 that the holder 1310 did not consent to the to the requested credential presentation subscription.

If the holder 1310 does consent at 1220, then the process 1200 proceeds to step 1230, where the credential presentation subscription details are recorded, for example, stored in the holder wallet 1312, subscriber wallet 1332, and/or other storage (e.g., storage 1350). Step 1230 may also include the holder agent 1314 sending a message to the subscriber agent 1334, notifying the subscriber 1330 that the holder 1310 did consent to the credential presentation subscription. Next, at step 1240, the credential included in the credential presentation subscription (e.g., credential 1316) can be automatically (without additional consent from the holder 1310) presented to the subscriber 1330 by the holder 1310, according to the subscription condition(s).

In other embodiments, the credential presentation subscription can specify that the credential presentations at step 1240 include presentations to one or more recipient(s) 1360 different than or in addition to the requestor (subscriber 1330). For example, in some embodiments, recipient(s) 1360 can be an administrator 150 acting on behalf of the subscriber 1330. Receipt of the credential presentation by the credential recipient(s) 1360 may be via an agent of the credential recipient 1360. In this manner, a subscriber 1330 (including via subscriber agent 1334) can act on behalf of or at the request of another party or simply prefer to utilize separate requesting and receiving entities/agents.

Figures 14, 15, 16:
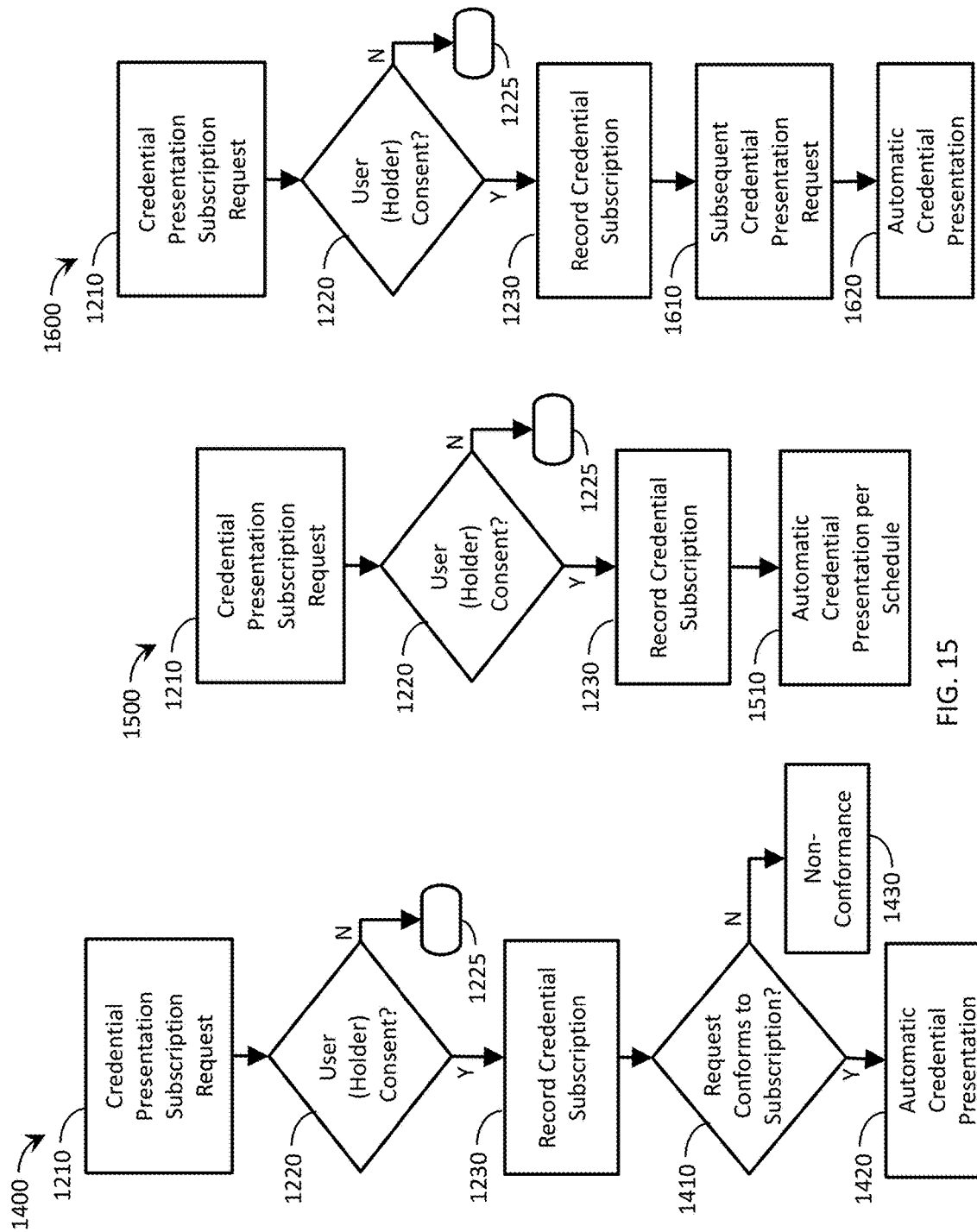
FIG. 14 is another flowchart showing exemplary steps associated with credential subscription request processes.
FIG. 15 is another flowchart showing exemplary steps associated with credential subscription request processes.
FIG. 16 is another flowchart showing exemplary steps associated with credential subscription request processes.

In various embodiments, in addition to or as part of step 1240, the holder 1310 can check that a subsequent credential presentation request complies with the subscription condition(s) (e.g., attributes, time period, frequency, etc.) before making the automatic presentation to the subscriber 1330. For example, in one embodiment, with reference to FIG. 14, which is a flowchart showing exemplary steps associated with credential subscription request processes 1400, and with continued reference to FIG. 13, depicting exemplary components, communications and data movement applicable to the processes 1400. In this embodiment, steps 1210-1230 may be the same as in process 1200. At step 1410, a subsequent credential presentation request is checked for conformance with the associated subscription, for example, by reference to the subscription recordation details. The conformance determination at step 1410 can include a comparison of the subscription condition(s) (e.g., attributes, time period, frequency, etc.) to those consented to at step 1220 and recorded at step 1230. If the subsequent credential presentation request does conform to the associated subscription, then the credential is presented at step 1420. If the subsequent credential presentation request does not conform to the associated subscription, then the request is non-conforming, the credential is not presented, and the process proceeds to step 1430, where the holder agent 1314 may send a message to the subscriber agent 1334, notifying the subscriber 1330 about the non-conformance and that the holder 1310 will not comply with the credential presentation request. In some embodiments, this exchange can initiate a new credential presentation subscription request from the subscriber 1330 with the new conditions.

In some embodiments, the holder 1310 can proceed with an automatic credential presentation according to a schedule defined in the subscription without requiring a subsequent credential presentation request from the subscriber 1330 during the subscription period. For example, in one embodiment, with reference to FIG. 15, which is a flowchart showing exemplary steps associated with credential subscription request processes 1500, and with continued reference to FIG. 13, depicting exemplary components, communications and data movement applicable to the processes 1500. In this embodiment, steps 1210-1230 may be the same as in process 1200. At step 1510, a subsequent automatic (without additional consent) credential presentation is made by the holder 1310 per a schedule defined by the subscription conditions and recorded at step 1230. For example, the subscription may require that the holder 1310 present the credential 1316 every year or any other time interval or frequency during the subscription period. In this manner, the subscriber 1330 need not make credential presentation requests during the subscription period. In some embodiments, the subscriber 1330 can notify the holder 1310 regarding any missed scheduled credential presentations.

In another embodiment, the holder 1310 proceeds with an automatic credential presentation in response to a subsequent credential presentation request from the subscriber 1330 during the subscription period. For example, in one embodiment, with reference to FIG. 16, which is a flowchart showing exemplary steps associated with credential subscription request processes 1600, and with continued reference to FIG. 13, depicting exemplary components, communications and data movement applicable to the processes 1600. In this embodiment, steps 1210-1230 may be the same as in process 1200. At step 1610, a subsequent automatic (without consent) credential presentation request is made by the subscriber 1330 during the subscription period. Then at step 1620, the holder 1310 automatically (without additional consent) presents credential 1316 according to the subscription condition(s). In some embodiments, the holder 1310 can notify the subscriber 1330 regarding a credential presentation request made after the subscription period ended. In these embodiments, the exchange can initiate a new credential presentation subscription request from the subscriber 1330 with a new term and/or other conditions.

The various steps and processes associated with different methods (e.g., 1200, 1400, 1500, 1600) can be combined, in whole or in part, in further embodiments. Components of different systems can similarly be combined. As described above, the various communications and signals (e.g., messages) associated with processes can be sent between the holder 1310 and subscriber 1330 via network 140, by interfacing agents 1314, 1334, and utilizing wallets 1312, 1332, respectively, and with the relevant information stored in wallets 1312, 1332, stored in other storage, and/or stored and/or verified on storage 1350. As defined above, storage 1350 can include various types of storage, including, for example, a general or administrative storage 152, a verifiable data registry 160, any other storage needed to facilitate the associated processes, etc. Records of transactions may be stored, for example, on storage 152, including via a transaction ledger and data that may be subject to subsequent verification may be stored/registered, for example, on storage 160. FIG. 13 also shows administrators 150, as mentioned above, which can act on behalf of or as proxies for one or more actors 1310, 1330 with various levels of delegated authority and access (e.g., to actor information, wallets, etc.) and via administrator agents. In this manner, administrators 150 can assume one or more roles of an actor 1310, 1330 during one or more of the associated communications or processes.

Figure 17:
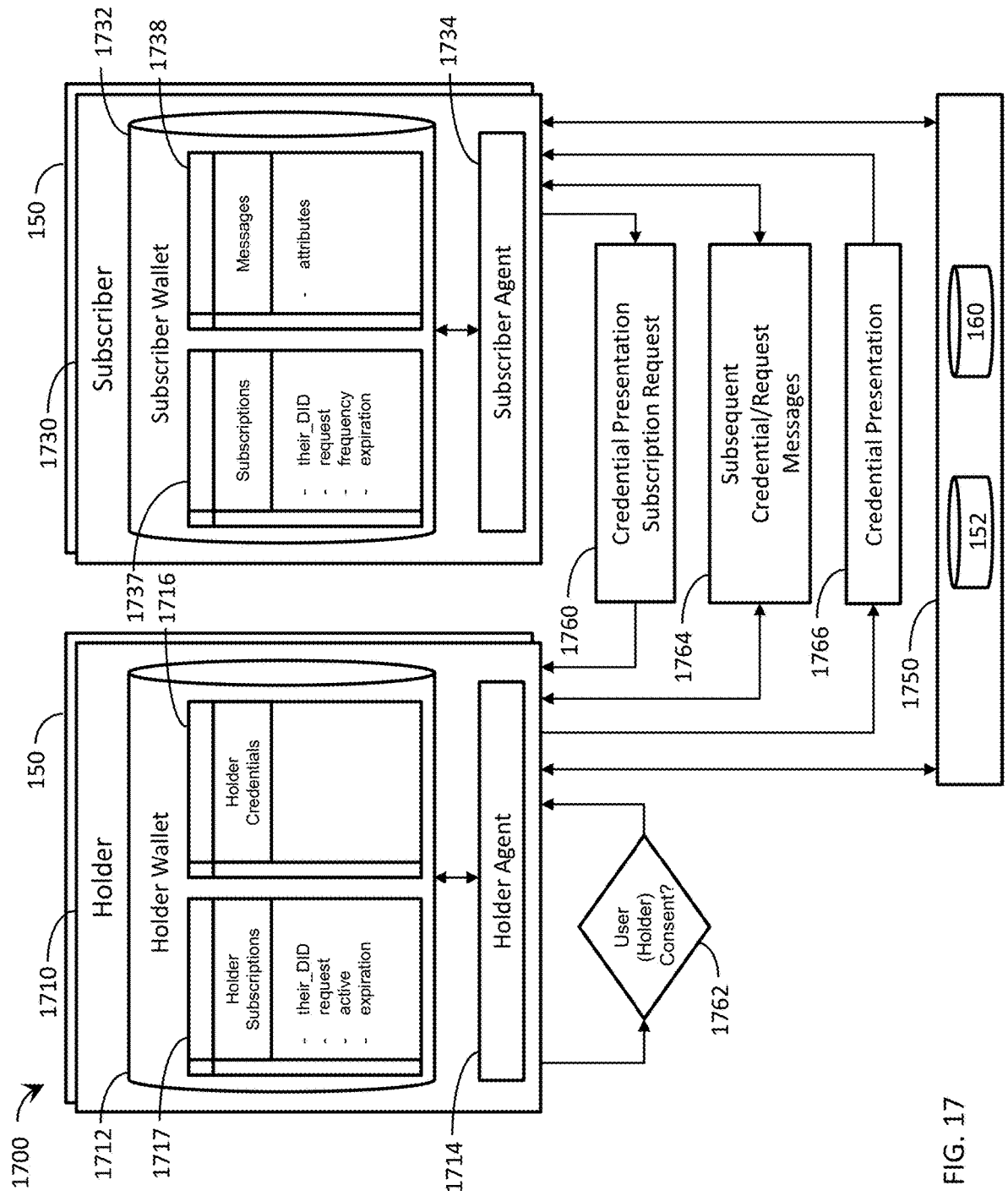
FIG. 17 is a block diagram of a system depicting exemplary components, communications and data movement associated with credential presentation subscription processes.

For example, FIG. 17 is a block diagram of a system 1700 depicting exemplary components, communications and data movement associated with credential presentation subscription processes (e.g., 1200, 1400, 1500, 1600). In this embodiment, a subscriber 1730 can create and send a credential presentation subscription request 1760 (e.g., via the subscriber agent 1734) to a holder 1710. For example, as defined in the system definitions, a secure message can be sent from the subscriber agent 1734 to the holder agent 1714 containing the list of credentials (and attributes) that will be queried on an ongoing basis. Next, the holder agent 1714 can communicate this request and determine the holder's consent to present the requested credentials according to the subscription conditions, for example, for a specified period of time or indefinitely, via a prompt 1762. If the holder 1710 does not consent to the request via the prompt 1762, then the request 1760 is denied. A message 1764 can be sent from the holder's agent 1714 to the subscriber's agent 1734, notifying the subscriber 1730 that the holder 1710 did not consent to the credential presentation subscription request 1760.

If the holder 1710 does consent via the prompt 1762, the presentation request and subscription details are recorded. For example, the holder's agent 1714 can create a record (that can be stored in the holder's wallet 1712 or a separate configuration database containing the holder subscriptions 1717) containing the details of the presentation request/status (e.g., their DID, request, active, and any applicable expiration date for which the consent has been granted, etc.). A message 1764 can be sent from the holder's agent 1714 to the subscriber's agent 1734, notifying the subscriber 1730 that the holder 1710 did consent to the credential presentation subscription request 1760.

To configure the subscription, the subscriber agent 1734 may also keep a record of the subscription 1737 (that can be stored in the subscriber wallet 1732 a separate configuration database containing subscriptions 1737, or other storage), along with other details (including, for example, their DID, request, frequency, expiration, etc.). The subscription details (e.g., conditions) can be subject to configuration by the subscriber 1730, including, for example, frequency.

During the subscription period (i.e., before expiration), the credential included in the credential presentation subscription (e.g., credential 1716) can be presented to the subscriber 1730 in a credential presentation 1766 by the holder 1710 without further consent, according to the subscription. In some embodiments, the subscriber 1730 can send the holder a message 1764 with a request to present the credential 1716. The credential 1716 can be presented whenever requested by or within the conditions (e.g., agreed to frequency) of the subscription. In other embodiments, the requested credential 1716 can be automatically presented on a predetermined interval or frequency without requiring subsequent subscriber credential requests, within the conditions (e.g., schedule, employment, etc.) of the subscription.

As described above, the various communications and signals can be sent between the holder 1710 and subscriber 1730 via network 140, by interfacing agents 1714, 1734, and utilizing wallets 1712, 1732, respectively, with the relevant information stored in wallets 1712, 1732, stored in other storage, and/or stored and/or referenced on storage 1750. As defined above, storage 1750 can include various types of storage, including, for example, a general or administrative storage 152, a verifiable data registry 160, any other storage needed to facilitate the associated processes, etc. Records of transactions may be stored, for example, on storage 152, including via a transaction ledger and data that may be subject to subsequent verification may be stored/registered, for example, on storage 160. FIG. 17 also shows administrators 150, as mentioned above, which can act on behalf of or as proxies for one or more actors 1710, 1730 with various levels of delegated authority and access (e.g., to actor information, wallets, etc.) and via administrator agents. In this manner, administrators 150 can assume one or more roles of an actor 1710, 1730 during one or more of the associated communications or processes.

In one application, the system and methods can be utilized in the medical field ecosystem. In this context, for doctors to become privileged to practice at a hospital, the hospital must credential those doctors against the hospital's bylaws, which can detail their respective "configurable requisite collection," which is discussed in more detail below. In this example, the hospital is "Atlas Health" and the doctor is still "Dr. Mary." To begin the credentialing process, Atlas Health (e.g., as a subscriber 1330, 1730) can send a credential presentation subscription request (e.g., 1210, 1760) to Dr. Mary (e.g., holder 1310, 1710). This presentation request is a message that contains and describes the requisite credentials that Dr. Mary will need to have and reveal to Atlas Health prior to starting work. In particular, for example, Atlas Health may require the following set of credentials from Dr. Mary: NPI; DEA; specialty board certifications; state licensure, education training; work history; sanctions; malpractice insurance; claims history; etc. The credential presentation subscription request can also specify how long Atlas Health needs access to this information (e.g., over a four year subscription period).

If Dr. Mary consents to sharing this requested information with Atlas Health, then Dr. Mary presents the credentials to Atlas Health (e.g., in a credential presentation 1240, 1766) and consents to their access to this information (via subsequent credential presentations) for the requested period of time. When Atlas Health needs to re-credential Dr. Mary to comply with their bylaws (e.g., this is often done every two years), since Dr. Mary has already consented to present those credentials (and the subscription period has not yet expired; i.e., four years have not passed), Atlas Health can send a credential presentation request to Dr. Mary and she will automatically present the requested credentials.

Furthermore, Atlas Health can configure the frequency with which it sends credential presentation requests for Dr. Mary's credentials within the subscription period (e.g., it could check the status of Dr. Mary's credentials via subsequent presentations on a daily cadence). After expiration of the subscription period, Atlas Health will not have automatic access to Dr. Mary's credentials and would need to submit a new credential presentation subscription request to Dr. Mary for them.

The purpose for continued presentations of credentials is to verify that the credentials are still valid and not revoked. For example, many types of credentials can be revoked due to, for example, expiration, lapse, becoming inaccurate, etc. For example, in one embodiment, with reference to FIG. 18, which is a flowchart showing exemplary steps associated with credential issuance and revocation processes 1800, and FIG. 19, which is a block diagram of a system 1900 depicting exemplary components, communications and data movement associated with the processes 1800. In this embodiment, at step 1810, an issuer 1920 issues a credential 1916 to a holder 1910, for example, via agents 1924, 1914, respectively. Next, at step 1820, a subscriber 1930 establishes a credential presentation subscription with the holder 1910 for subsequent presentations of credential 1916, for example, via agents 1934, 1914, respectively. In response to subsequent credential presentation requests according to the subscription, the holder may be successful in making subsequent credential presentation attempts 1940.

Then, at step 1830 (at some point after the issuer 1920 issued the credential 1916 to the holder and possibly after making successful subsequent credential presentation attempts 1940), the credential 1916 becomes revoked. (e.g., credential 1916 expired, lapsed, becomes inaccurate, etc.). In view of this status change, the issuer 1920 can post information to the verifiable data registry 160 and send a message to the holder 1910 regarding the revocation of the credential 1916. In response to subsequent credential presentation requests according to the subscription, the holder will fail during a credential presentation attempt 1940, resulting in a failed credential presentation at step 1840 (if the credential is not reinstated or re-issued in the meantime). In particular, since a credential presentation includes a proof of the credential's non-revocation, as discussed above, the changed status of the credential 1916 stored and/or referenced on the verifiable data registry 160 will cause the credential presentation to fail because this proof will not be possible. In this manner, the subscriber 1930 will be alerted to the holder's lack of credential 1916.

As described above, the various communications and signals can be sent between the holder 1910, issuer 1920, and subscriber 1930 via network 140, by interfacing agents 1914, 1924, 1934, and utilizing wallets 1912, 1922, 1932, respectively, with the relevant information stored and/or referenced on storage 1950. As defined above, storage 1950 can include various types of storage, including, for example, a general or administrative storage 152, a verifiable data registry 160, any other storage needed to facilitate the associated processes, etc. Records of transactions may be stored, for example, on storage 152, including via a transaction ledger and data that may be subject to subsequent verification may be stored/registered, for example, on storage 160. FIG. 19 also shows administrators 150, as mentioned above, which can act on behalf of or as proxies for one or more actors 1910, 1920, 1930 with various levels of delegated authority and access (e.g., to actor information, wallets, etc.) and via administrator agents. In this manner, administrators 150 can assume one or more roles of an actor 1910, 1920, 1930 during one or more of the associated communications or processes.

Various credentials can be grouped or organized into a configurable requisite collection (CRC). The CRC can be used as a standard, for example, tailored for a particular job and/or in compliance with a governing body for an industry. For example, in one embodiment, with reference to FIG. 20, which is a flowchart showing exemplary steps associated with configurable requisite collection establishment processes 2000, and FIG. 21, which is a block diagram of a system 2100 depicting exemplary components, communications and data movement associated with the processes 2000. In this embodiment, at step 2010, an actor (e.g., subscriber 2130) can select one or more credential schema(s) (CS) from the list of credential schemas 2162 (e.g., housed on the verifiable data registry 160) relevant to the set of job requirements the actor intends to represent (e.g., via agent 2134). The CSs 2162 can include a list of attribute names in a credential. Next, at step 2020, the actor then sets the desired configuration for the CRC, including, for example, as a set of rules. For example, in addition to a set of credentials, other configuration rules can include: continuity requirements; on-going certification requirements; gap requirements; accepted issuers that can be used for a specific credential type; other business rules; etc. These rules can be related to the credentials, work history, other rules, etc. The defined CRC 2030 can be saved (e.g., in the subscriber wallet 2132) for use as the standard requirements for a particular job or position.

In one application, the system and method can be utilized in the medical field ecosystem. In this context, as mentioned above, a hospital can credential doctors in accordance with the hospital's bylaws, which can detail their respective CRCs. In this example, the hospital Atlas Health is National Committee for Quality Assurance (NCQA) certified and has drafted its bylaws such that they require compliance with NCQA Credential Verification Organization (CVO) standards. These NCQA standards prescribe the requisite credentials that a doctor would have to have and present to the hospital to proceed through credentialing and privileging the doctor in compliance with the standard. Therefore, Atlas Health (e.g., as a subscriber 2130) picks the NCQA set of credentials CS (which could require credentials for: Licensure; DEA; Education & Training; Board Certifications; Work History; Malpractice History; Malpractice Insurance Coverage; State Licensing Board Sanctions; Medicare/Medicaid Sanctions; Attestations; Ongoing Sanctions; etc.) at step 2010. In addition, Atlas Health picks the relevant configuration rules at step 2020. With both established, Atlas Health has configured their NCQA specific CRC 2030.

Once established, CRCs can be used to determine qualifications for a particular job or position, including in compliance with a governing standard for the industry. Mechanisms can be implemented to request and evaluate whether or not a holder satisfies a CRC. For example, in one embodiment, with reference to FIG. 22, which is a flowchart showing exemplary steps associated with configurable requisite collection verification processes 2200, and with continued reference to system 2100 of FIG. 21, depicting exemplary components, communications and data movement associated with the processes 2200. In this embodiment, at step 2210, a CRC presentation request can be made by a subscriber 2130 to a holder 2110, for example as defined above, via a secure message sent from a subscriber agent 2134 to a holder agent 2114 containing the requested CRC 2030. Next, at step 2220, the holder agent 2114 can perform or execute a CRC evaluation to determine whether the holder wallet 2112 includes credentials 2116 and any other aspects that satisfy the CRC 2030, including via an existing CRC 2130. If the holder 2110 does not possess the requisite credentials according to the CRC 2030, then the CRC presentation request will not be fulfilled. A message can be sent from the holder agent 2114 to the subscriber agent 2134, notifying the subscriber 2130 that the holder 2110 cannot fulfill the requirements of the CRC 2030.

If the holder 2110 does possess the requisite credentials 2116 to satisfy the CRC 2030, at step 2230, a CRC presentation proposal can be made by the holder 2110 to the subscriber 2130, for example, via a secure message sent from the holder agent 2114 to the subscriber agent 2134 containing the requested CRC 2130 from the holder wallet 2116.

In one application, the system and method can be utilized in the medical field ecosystem. Continuing with the example above, after Atlas Health has established their CRC (e.g., CRC 2030) in adherence to NCQA standards, Atlas Health can now implement this CRC, requiring prospective doctor applicants to offer up or present a set of credentials satisfying the CRC. Therefore, Atlas Health (e.g., as a subscriber 2130) can make a CRC presentation request at step 2210, which is similar to a credential presentation request, as described above. Step 2210 can follow the same process, but instead of requesting a singular credential presentation from the doctor (e.g., as a holder 2110), the hospital sends a request for the entire set of doctor's credentials (e.g., credentials 2116) satisfying the CRC. In this example, Atlas Health (subscriber 2130) sends the CRC presentation request (2210) to Dr. Mary (holder 2110). Next, for the CRC evaluation at step 2220, Dr. Mary evaluates whether she currently has the required credentials to satisfy Atlas Health's CRC request. Then, Dr. Mary can send a CRC presentation proposal to Atlas Health with her relevant credentials 2116/CRC 2130 at step 2230 if Dr. Mary can satisfy Atlas Health's CRC request with the right set of credentials in her wallet 2112.

As described above, the various communications and signals can be sent between the holder 2110 and subscriber 2130 via network 140, by interfacing agents 2114, 2134, and utilizing wallets 2112, 2132, respectively, with the relevant information stored and/or referenced on storage 2150. As defined above, storage 2150 can include various types of storage, including, for example, a general or administrative storage 152, a verifiable data registry 160, any other storage needed to facilitate the associated processes, etc. Records of transactions may be stored, for example, on storage 152, including via a transaction ledger and data that may be subject to subsequent verification may be stored/registered, for example, on storage 160. FIG. 21 also shows administrators 150, as mentioned above, which can act on behalf of or as proxies for one or more actors 2110, 2130 with various levels of delegated authority and access (e.g., to actor information, wallets, etc.) and via administrator agents. In this manner, administrators 150 can assume one or more roles of an actor 2110, 2130 during one or more of the associated communications or processes.

In one embodiment, a digital-signed and time-stamped representation of a resume or a curriculum vitae (CV), whereby each credential listed has a signature indicating the issuer and time and date of presentation, can be created as a digitally verified resume (DVR). In particular, a DVR can list various types of verified credentials, including, for example, pertaining to any combination of the following: Education: credentials related to the education of the credential holder, including undergrad, graduate, professional degrees, and continuous education certificates; Training: credentials related to the training of the credential holder, including apprentice, internship, residency programs, fellowships, and other specialized training; Licenses: credentials of the credential holder related to licenses; Certifications: credentials of the credential holder related to certifications; Adverse Events: credentials of the credential holder related to historically reported adverse events (e.g., malpractice judgements, censures, convictions, etc.); Performance or Quality Scores: credentials and scores of the credential holder related to earned performance or quality scores; Other: other credentials relevant to a common resume such as photos, contact information, etc.

For example, in one embodiment, with reference to FIG. 23, which is a flowchart showing exemplary steps associated with digitally verified resume creation processes 2300, and FIG. 24, which is a block diagram of a system 2400 depicting exemplary components, communications and data movement associated with the processes 2300. In this embodiment, at step 2310, a holder 2410 selects a resume layout template suitable for the purpose of the DVR (e.g., via the holder agent 2414). Next, at step 2320, the holder 2410 can select individual credentials 2416 to be added to a new CRC from their holder wallet 2412. Alternatively, or additionally, at step 2330, the holder 2410 can select an existing CRC 2418 to be included in the DVR. For example, in one embodiment, the holder 2410 can select an existing CRC 2418 as a baseline and add additional credentials 2416 to it for the DVR. Then, the holder 2410 can provide consent to the system for the creation of the DVR 2340 and/or allowing the holder agent 2414 to create or publish a DVR document representation 2440 of each of the layout template and CRC that can be shared with subscribers 2430 or other viewers 2470 of their choice. In one embodiment, upon the execution of the DVR publishing process, the system can collect and verify the credentials 2416 selected by the holder 2410 and create a document in standard format, including, for example, portable document format (PDF), hypertext markup language (HTML), etc.

As described above, the various communications and signals can be sent between the holder 2410 and subscriber 2430 via network 140, by interfacing agents 2414, 2434, and utilizing wallet 2412, with any relevant information stored and/or referenced on storage 2450. As defined above, storage 2450 can include various types of storage, including, for example, a general or administrative storage 152, a verifiable data registry 160, any other storage needed to facilitate the associated processes, etc. Records of transactions may be stored, for example, on storage 152, including via a transaction ledger and data that may be subject to subsequent verification may be stored/registered, for example, on storage 160. FIG. 24 also shows administrator 150, as mentioned above, which can act on behalf of or as proxies for one or more actors 2410 with various levels of delegated authority and access (e.g., to actor information, wallets, etc.) and via administrator agents. In this manner, administrators 150 can assume one or more roles of an actor 2410 during one or more of the associated communications or processes.

In one embodiment, a dynamic rating system (DRS) can be used for automatically calculating a composite credibility rating derived from combinations of factors related to an issuer and/or their issued credentials. In particular, various factors included in the DRS can include: Type: a numeric representation of the type of credential (e.g. objective or subjective); Proximity: a numeric representation of the proximity to the original source of the proof (e.g. direct or once-removed, but acting as its officially recognized proxy); Endorsement: a numeric representation of the endorsement rating indicating the relative number of standards-bodies associated with the proof (e.g., NCQA, Joint Commission, etc.); Recency: a numeric representation of the recency or freshness of the data (e.g. real-time, daily updates, weekly updates, etc.); Consensus: a numeric representation of the number of instances whereby the issuer's credential is included in CRCs multiplied by the number of active credential holder subscriptions; Consensus Slope: a numeric representation of the daily, weekly, monthly, annual, etc. growth or decline of inclusion within CRCs multiplied by the number of active credential holder subscriptions or other factors; etc.

Figure 25:
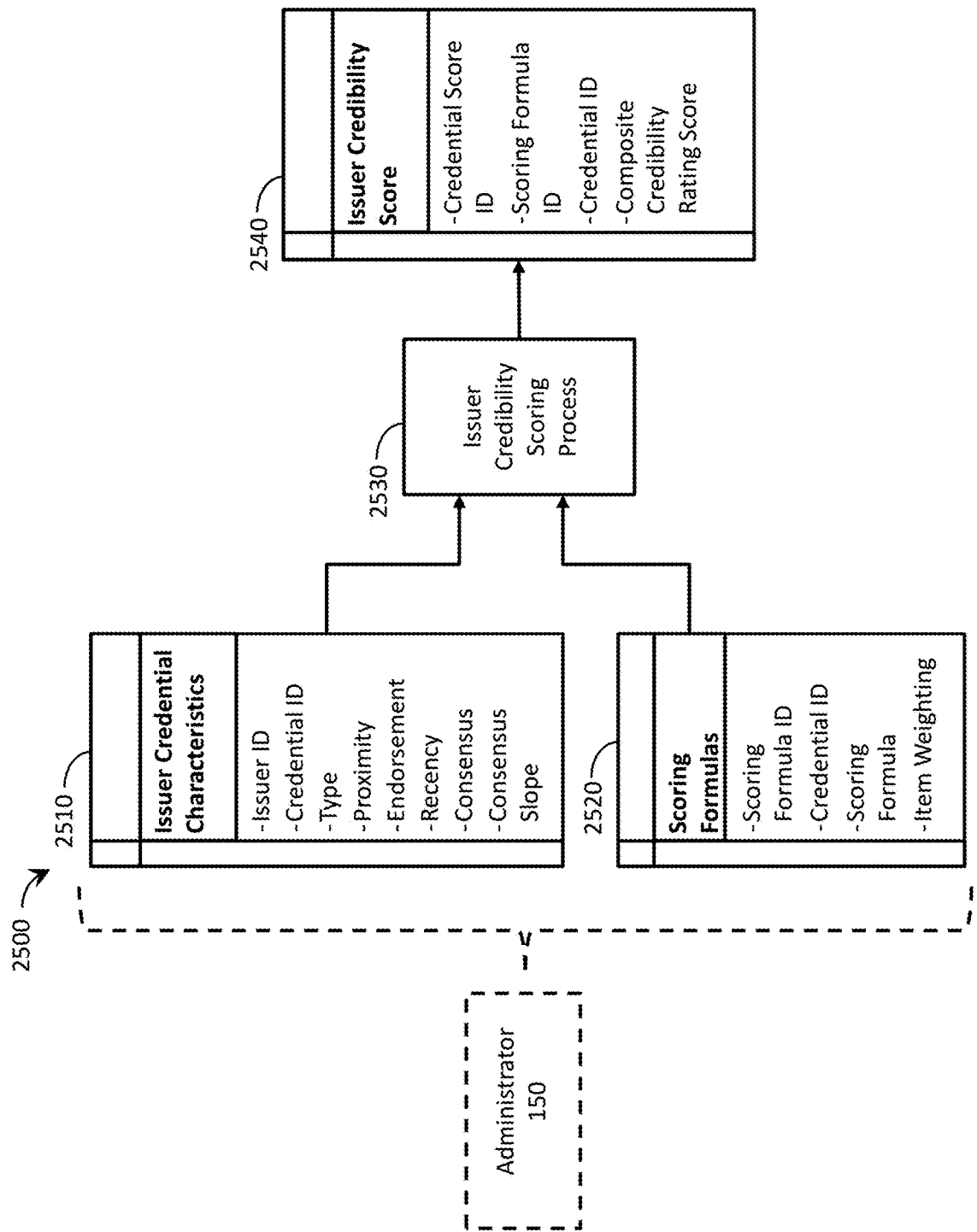
FIG. 25 is a flowchart showing exemplary steps associated with dynamic rating system processes.

For example, in one embodiment, with reference to FIG. 25, which is a flowchart showing exemplary steps associated with dynamic rating system processes 2500, and to FIG. 1 for depicting exemplary components, communications and data movement associated with the processes 2500. In one embodiment, the processes 2500 are an administrative function and executed by an administrator 150. In this embodiment, the DRS can utilize various issuer (e.g., issuer 120) credential characteristics 2510 and various scoring formulas 2520 as inputs to an issuer credibility scoring process 2530 to generate an issuer credibility rating or score 2540. In various embodiments, the system can calculate and store a composite credibility rating score and other data as part of the issuer credibility score 2540 at a configurable interval.

For example, in various embodiments, issuer credential characteristics 2510 can include an issuer ID, credential ID, type, proximity, endorsement, recency, consensus, consensus slope, as well as any other characteristic and/or combinations thereof. Scoring formulas 2520, for example, in various embodiments, can include scoring formula ID, credential ID, scoring formula algorithms, item weighting, as well as any other characteristic and/or combinations thereof.

For example, in one embodiment, the issuer credibility scoring process 2530 generates the issuer credential score 2540, including a composite credibility rating score normalized into a range between 0 and 1, based on pre-configured combinations of the numeric values for each issuer's credential described above. For instance: Type[0.15]+Proximity [0.15]+Endorsement [0.15]+Recency [0.15]+Consensus [0.2]+Consensus Slope [0.05]=Composite Credibility Rating Score [0.85]. The issuer credibility scores 2540 can be published to a record at a configurable interval and include, for example, credential score ID, scoring formula ID, credential ID, composite credibility rating score, etc. This record (and others associated with this and similar processes) can be stored in an administrator database/storage 152, another database/datastore, storage 160, etc.

Figure 26:
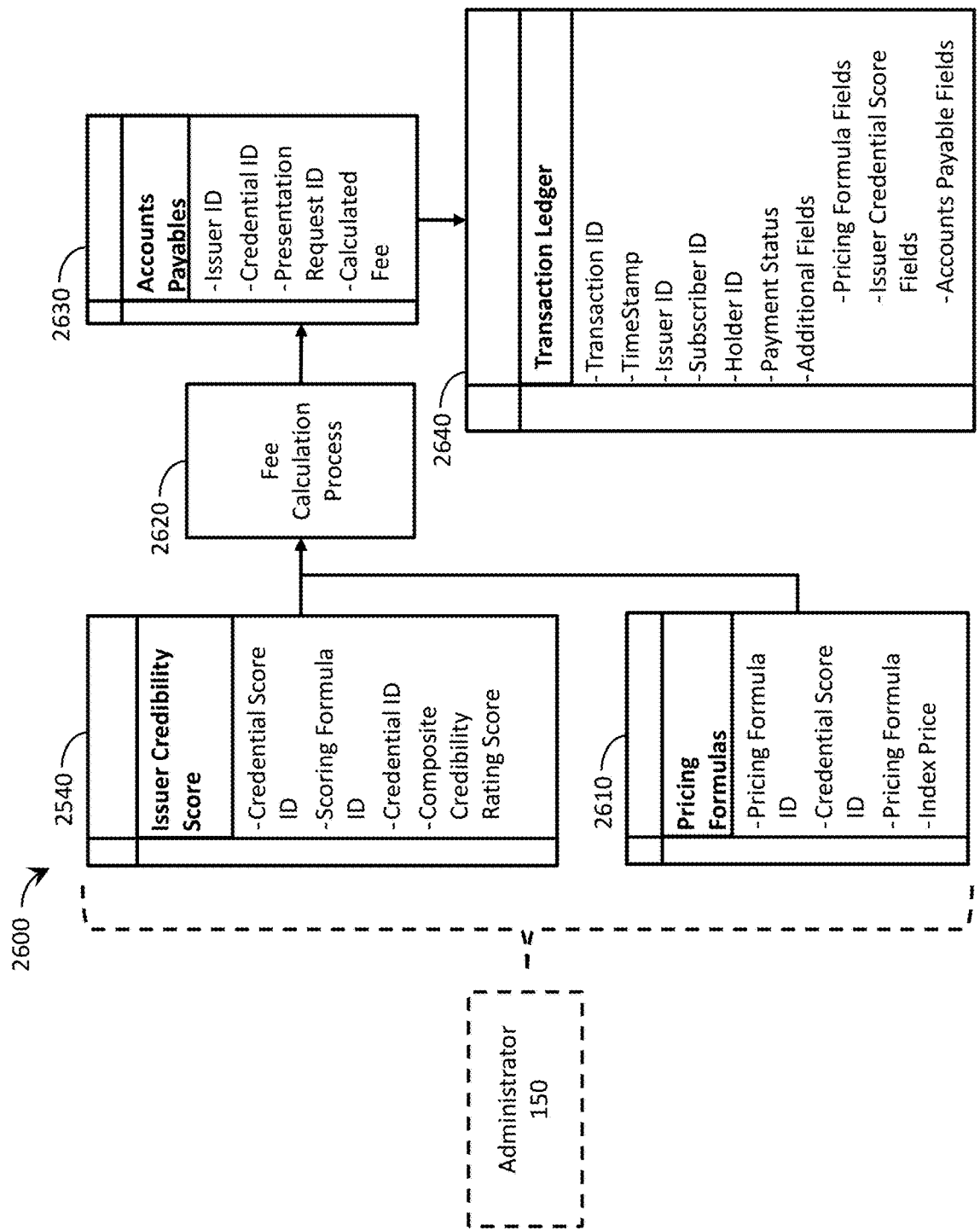
FIG. 26 is a flowchart showing exemplary steps associated with fee calculation processes.

In another embodiment, the issuer credibility score 2540 can be used to automatically calculate fees paid to the issuer based on their rating or score. In particular, the composite credibility rating score can be used for calculating a fee to be paid to the issuer based on various pricing formulas. For example, in one embodiment, with reference to FIG. 26, which is a flowchart showing exemplary steps associated with fee calculation processes 2600, and to FIG. 1 for depicting exemplary components, communications and data movement associated with the processes 2600. In one embodiment, the processes 2600 are an administrative function and executed by administrator 150. In this embodiment, the system can utilize the issuer credibility score 2540 and various pricing formulas 2610 as inputs to a fee calculation process 2620 to generate accounts payables 2630.

For example, in various embodiments, pricing formulas 2610 can include pricing formula ID, credential score ID, pricing formula, index price, as well as any other factor/algorithm and/or combinations thereof. In various embodiments, these pricing formulas 2610 can be used to calculate fees based on the issuer credibility score 2540, which can generate the accounts payables 2630. The accounts payables 2630 can include, for example, issuer ID, credential ID, presentation request ID, calculated fee, etc. In one exemplary embodiment, an index price can be multiplied by the composite credibility rating score at 2620 for each corresponding credential presentation request, as described above.

In various embodiments, the accounts payables 2630 can be input to a transaction ledger 2640. For example, in various embodiments, the transaction ledger 2640 can include transaction ID, timestamp, issuer ID, subscriber ID, holder ID, payment status, and various additional fields, such as, pricing formula fields, issuer credential score fields, accounts payable fields, etc. The transaction ledger 2640 (and other data associated with this and similar processes) can be stored in an administrator database/storage 152, another database/datastore, storage 160, etc.

Figure 27:
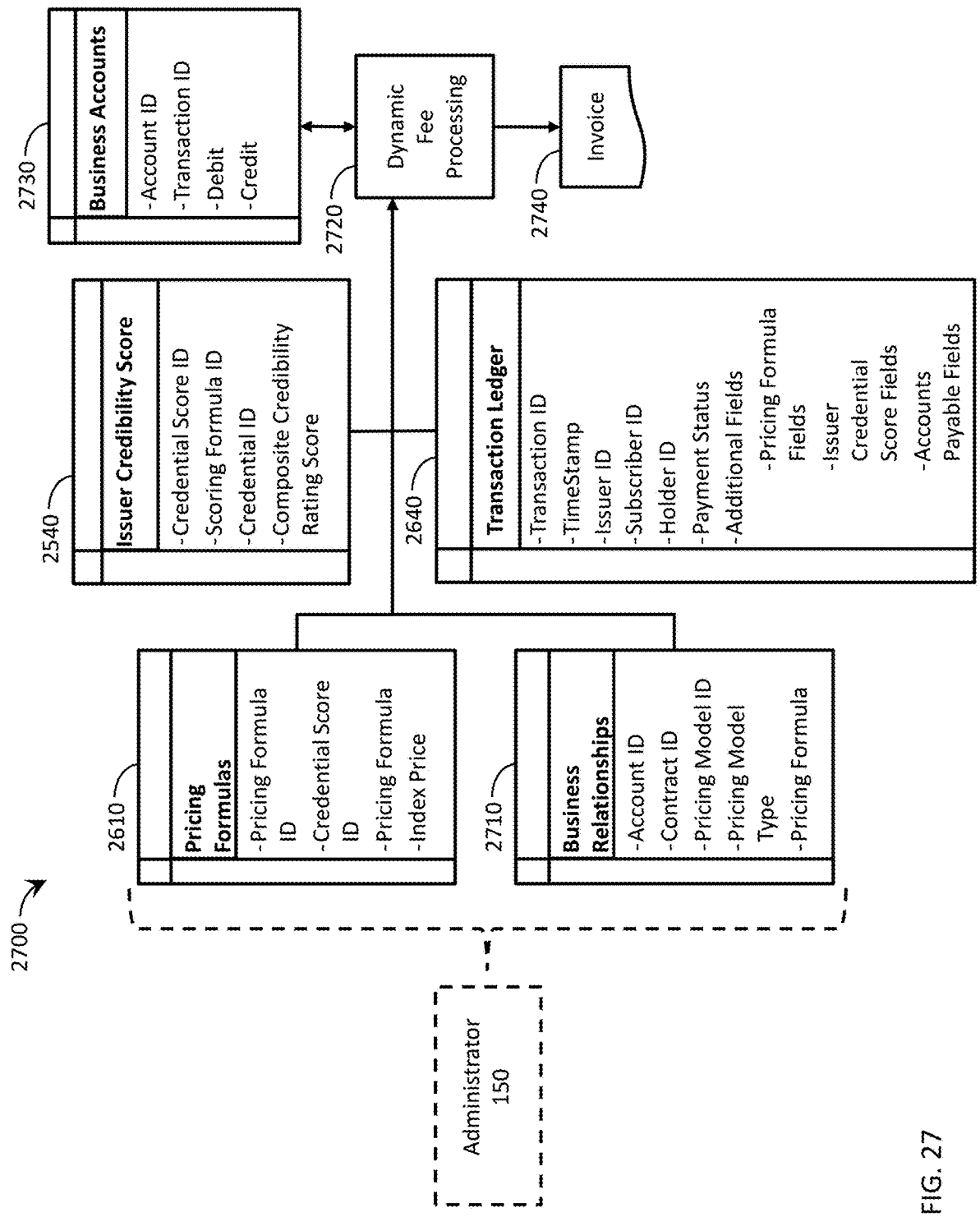
FIG. 27 is a flowchart showing exemplary steps associated with dynamic fee processes.

In another embodiment, various sources of information can be used as part of a dynamic fee system (DFS). The DFS can be used for automatically calculating the fees charged to a subscriber, issuer, and/or holder, including based on, for example, pre-determined business rules and contracts supporting multiple pricing models. For example, in one embodiment, with reference to FIG. 27, which is a flowchart showing exemplary steps associated with dynamic fee processes 2700, and to FIG. 1 for depicting exemplary components, communications and data movement associated with the processes 2700. In one embodiment, the processes 2700 are an administrative function and executed by administrator 150. In this embodiment, the system can utilize the issuer credibility score 2540, pricing formulas 2610, the transaction ledger 2640, and business relationships 2710 as inputs to a dynamic fee processing system 2720. In other embodiments, more or less inputs may also be used.

In this embodiment, business relationships 2710 can include account ID, contract ID, pricing model ID, pricing model type, pricing formula, as well as any other factor and/or combinations thereof. In various embodiments, the pricing model types used by the DFS can include: Bundled Pricing: a period-based (e.g., annual) flat-fee per collection (e.g., CRC) of credentials related to an individual credential holder (this fee may vary between parties depending on business terms); Transaction Pricing: a flat fee charged per credential presentation for each transaction instance (this fee may vary between parties depending on business terms); Variable Transaction Pricing: a variable fee charged per credential presentation for each transaction instance (the fee amount may vary depending on fees calculated using the DRS for each credential and depending on business terms).

In this embodiment, at a configurable interval, the DFS can access data stored in the transaction ledger 2640, such as, for example, subscriber ID, holder ID, issuer ID, transaction ID, and timestamp. Using dynamic fee processing 2720, the DFS can calculate entries to business accounts 2730, including, for example, financial debits or credits to the accounts of the subscriber 130, holder 110, and/or issuer 120, for example, based on business rule formulas defined for each business relationship defined in the business relationships database 2710. In various other embodiments, other inputs from the issuer credibility score 2540, pricing formulas 2610, the transaction ledger 2640, and/or business relationships 2710 can also be used.

In other embodiments, the DFS can be used to generate invoices 2740, including based on the status of the business accounts 2730. Invoices 2740 may be processed through conventional and/or digital payment systems, including, for example, utilizing token-based currencies. Wallets 112, 122, 132 may be used to settle accounts and/or store payments/balances. Records associated with accounts and/or invoices (as well as others associated with this and similar processes) can be stored in an administrator database/storage 152, another database/datastore, storage 160, etc.

As described above, the various communications and signals associated with the above processes (e.g., 2500, 2600, 2700) can be sent between the holder 110, issuer 120, subscriber 130, and administrator 150 via network 140, by interfacing agents 114, 124, 134 and utilizing wallets/storage 112, 122, 132, 152 with any relevant information stored and/or referenced on a verifiable data registry 160 and/or other storage.

As described in detail above, the systems and methods can involve various information flows associated with credentials (e.g., 116). Each process can be a value stream that presents the possibility for both compensation and fees (e.g., revenue and cost) for the actors involved (e.g., holder 110, issuer 120, subscriber 130). Generally, between any two actors (regardless of role), the facilitation of inter-agent communication (e.g., via the administrator 150) could also be associated with a charge/compensation.

With reference to FIG. 1 and the various processes described above, the following are exemplary value streams that may be associated with a charge/compensation.

For example, from an issuer 120 perspective: Issuance—issuers 120 issue credentials 116 to holders 110 (which is the first possible event for a given credential 116; subsequent occurrences involving that credential 116 happen after issuance). In some embodiments, issuers 120 can be compensated for the issuance of a credential 116 (e.g., NTIS DEA compensated for issuing Dr, Mary a DEA Certification); in another embodiment, issuers 120 can be charged a fee for the issuance of a credential 116; Revocation—issuers 120 can revoke a credential 116 from a holder 110, rendering it no longer valid. In some embodiments, issuers 120 could be compensated for the revocation of a credential 116 (e.g., NTIS DEA compensated for revoking Dr. Mary's DEA Certification because it is no longer in valid standing); in another embodiment, issuers 120 could be charged a fee for the revocation of a credential 116; Credential Definition Creation and Credential Schema Creation—issuers 120 can create CDs and CSs.

For example, from a holder 110 perspective: Presentation—holders 110 can present their credentials 116 to subscribers 130. Holders 110 could be compensated for their credential presentations to subscribers 130. Subscribers 130 could be charged a fee for receiving a holder 110 credential presentation. Holders 110 could be charged a fee for their presentations. Subscribers 130 could be compensated for receiving a holder 110 credential presentation; Transfer/Delegation—holders 110 can transfer a credential 116 to another holder 110. Holders 110 could both be compensated or charged for transferring of credentials 116; Deletion—holders 110 can delete credentials 116 from their wallet 112 and could be compensated or charged for deletion of a credential 116.

For example, from a subscriber 130 perspective: Verification (& Subscription)—subscribers 130 can verify the authenticity of a holder 110 credential presentation by checking its status (e.g., revocation, expiration, etc.). Subscribers 130 could be compensated for verification of credentials 116 or could be charged for the verification of credentials 116.

For example, from an administrator 150 perspective: for administration (e.g., any of the tasks, roles, processes, services, etc. that an administrator provides, facilitates and/or is involved with).

In various embodiments, any fees associated with the systems and/or methods can be communicated, calculated, processed, etc. via the processes above (including, e.g., 2600, 2700).

For example, in one exemplary embodiment, the system can provide a method by which a token of monetary value or fiat-based currency can be paid from a central electronic treasury or third party to any actor for any service (e.g., to an issuer 120 in exchange for verification services). In an exemplary embodiment, verification tokens are stored in a digital token wallet 132 belonging to the subscriber 130. In some embodiments, the system can provide a method by which the amount of token-related payment to an issuer 120 or subscriber 130 can be reduced or increased based upon a myriad of factors including, for example, their credibility score (e.g., issuer credibility score 2540) at any given time.

For example, in one embodiment, a claim and a subsequent validation of a professional credential. Initially, a physician (e.g., holder 110) applies and is conditionally accepted for a position at a local hospital. Upon processing the physician's application, the hospital's human resource (HR) department representative (e.g., subscriber 130) will begin the process of credentialing the physician so that medical procedure privileges can be granted. In this example, the HR representative must confirm the assertion of proper credentials made by the physician (e.g., according to a CRC 2030), such as, for example, a medical degree from an accredited medical school, a medical license for the state where the physician will practice, and employment at her last post. Rather than manually confirming each of these credentials via telephone calls and other manual means, the HR representative (subscriber 130) instead logs into a secure web portal, views (e.g., via subscriber agent 134) the assertions made by the physician, and cross references the physician's credentials (e.g., credentials 116) with any associated and trusted third party verifications of those credentials, as well as any conditions or limitation that exist, such as expiration.

Prior to this process occurring, the physician (holder 110) had created a digital account identity in the system, including claims of credentials 116, such as a medical degree from an accredited medical school, a medical license for the state where the physician will practice, and employment at her last post. As part of the assertion process, the physician can also establish digital links to supporting files stored, and at times, encrypted in third party systems. Electronic notifications can be sent from the physician to the appropriate issuers 120. For instance, in the case of a medical degree, an electronic message could be sent to the school's alumni office requesting confirmation of the physician's attendance and degree.

With a credential assertion on screen, the medical school representative (as issuer 120) can review the credential request and electronically attest to its authenticity by issuing the credential 116. In some exemplary embodiments, all attestations of authenticity can be stored in the system along with the digital ID of the issuer 120. Upon presentation of these digital credentials 116 to a third-party subscriber 130 or inquirer, a digital key can be provided to each third-party to enable decryption and viewing all documentation.

If at any point in the future, a verification is disputed and deemed to be false by means of cross-validation, such as a consensus algorithm, the overall rating or score of that particular issuer 120 (e.g., issuer credibility score 2540) can be reduced. In this example, the hospital's HR representative (subscriber 130) could chose to trust only certain issuers 120 with credibility scores at or above a certain level. Each time the school makes a verification that is later accepted by another third party, that school could receive compensation, for example, as a verification token or fiat-based currency, in exchange for their work.

The hospital/HR representative (subscriber 130) can also establish a credential presentation subscription with the physician (holder 110) that allows the hospital to continuously monitor the validity of the physician's credentials 116 over time (e.g., via process 1300), including, for example, with one or more payments to a facilitator (e.g., administrator 150). In the event that a credential 116 becomes invalid, revoked, suspended, etc., the physician (holder 110) and hospital (subscriber 130) can be alerted.

In this embodiment, verification tokens can be stored in a digital token wallet 122 belonging to the school (issuer 120). These can be stored in an audit ledger database, for example, in the various storage described above. In some embodiments, these verification tokens can later be exchanged for conventional currency (e.g., U.S. dollars), used as payment for credentialing services needed by that school in the future, and/or purchased by other organizations and individuals who are members of the system's network.

In this manner, the systems and methods act as a proof network, making presenting credentials 116 easy, safe, secure, and instantaneous. The systems and methods enable users (holders 110) to request and receive digitally signed credentials 116 from primary sources (issuers 120) that they can securely share, for example, with employers, health systems, and/or insurance plans (subscribers 130). The system can proactively monitor conditional events, such as expirations and dependencies, allowing holders 120 and/or subscribers 130 to address issues as soon as possible. Credentials 116 will be up-to-date, ready to present, and aligned with standards. This can eliminate the need for subscribers 130 (e.g., health systems) to request redundant information, dramatically shortening the time it takes to hire, privilege, enroll, and activate holders 110 (e.g., practitioners).

Figure 28:
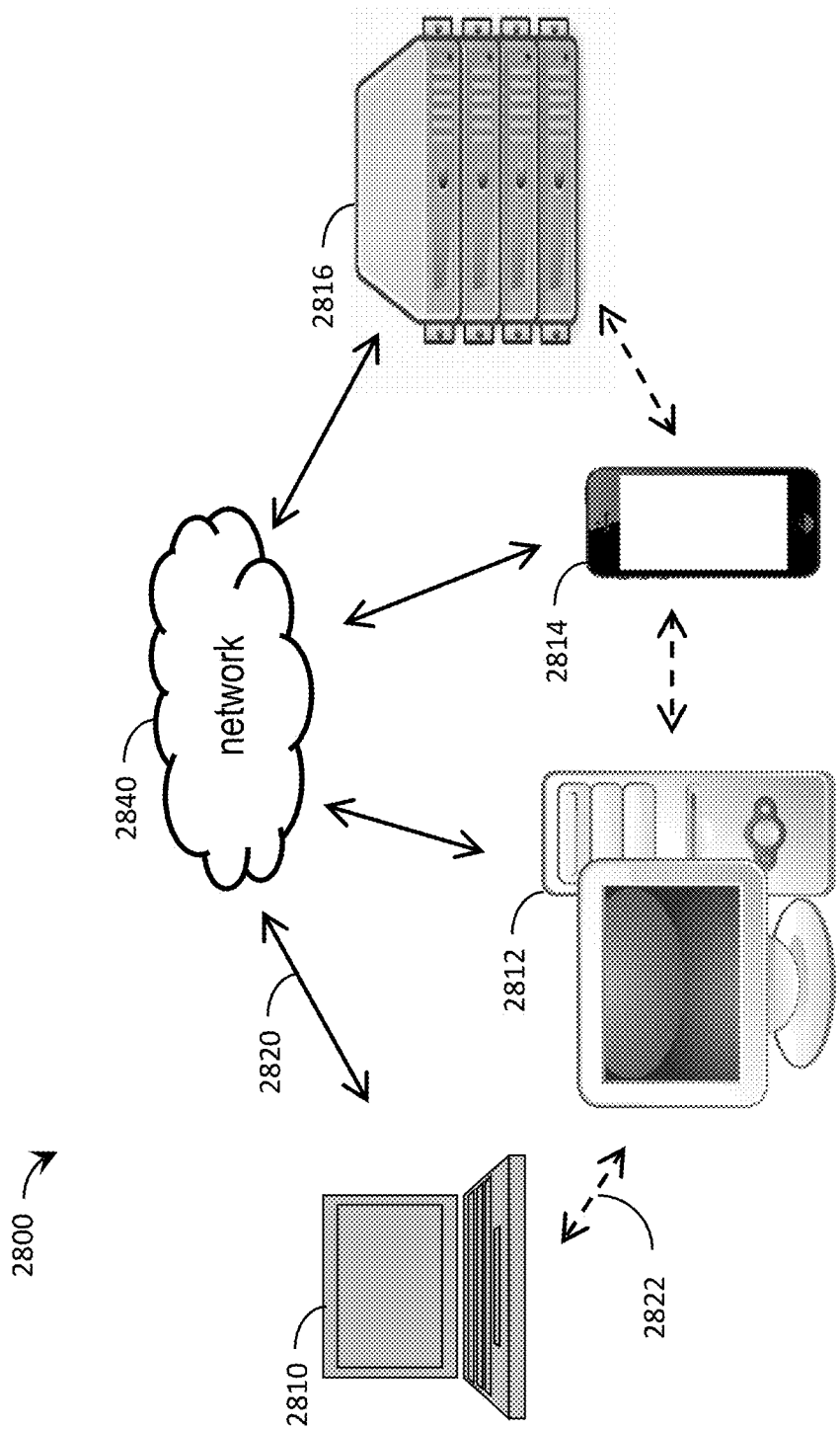
FIG. 28 depicts exemplary devices connectable to the ecosystem or system on behalf of the actors.
Figure 29:
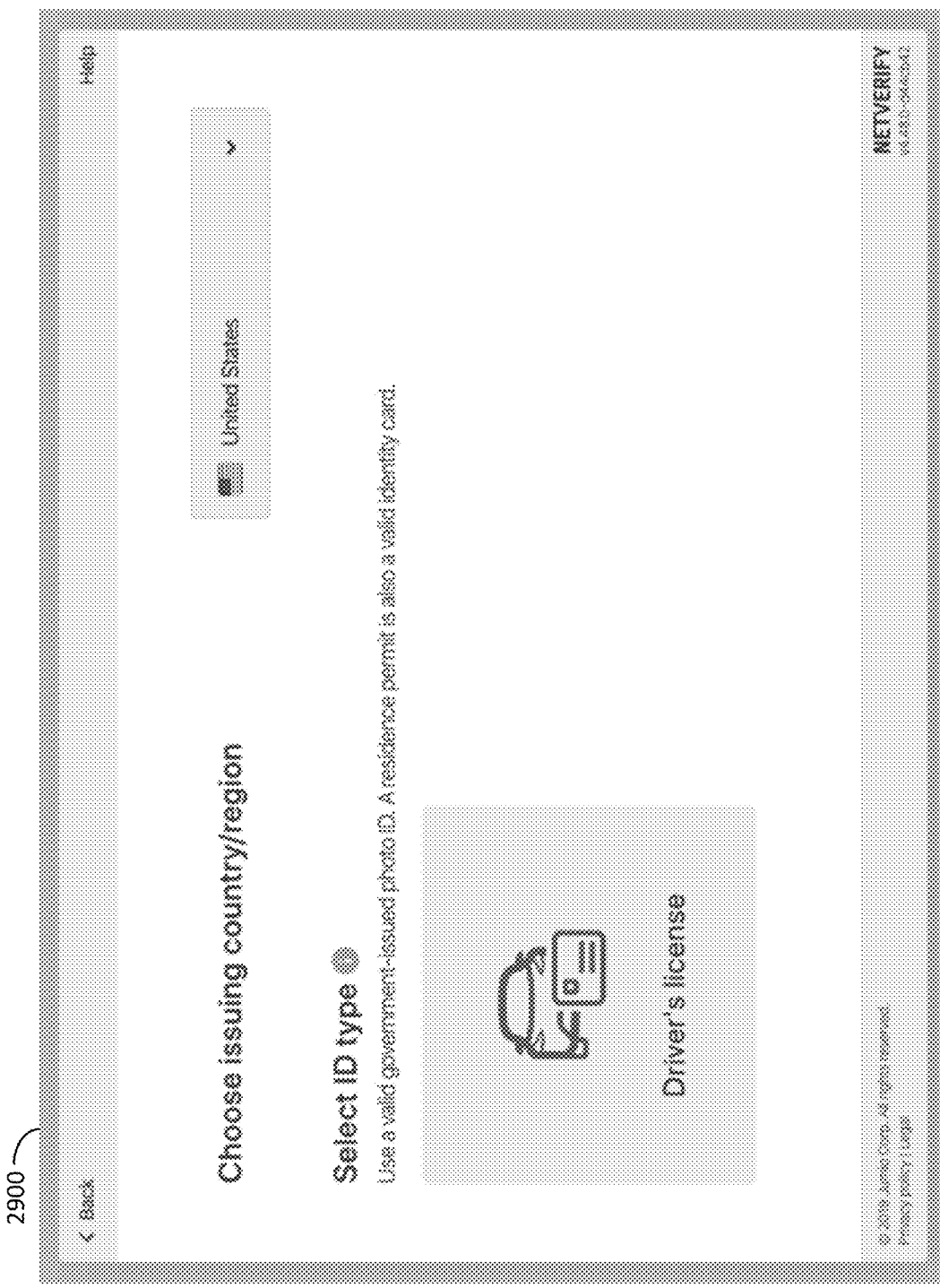
FIG. 29 shows an exemplary screenshot of a user interface displayed on an exemplary computer during enrollment for documentation.
Figure 30:
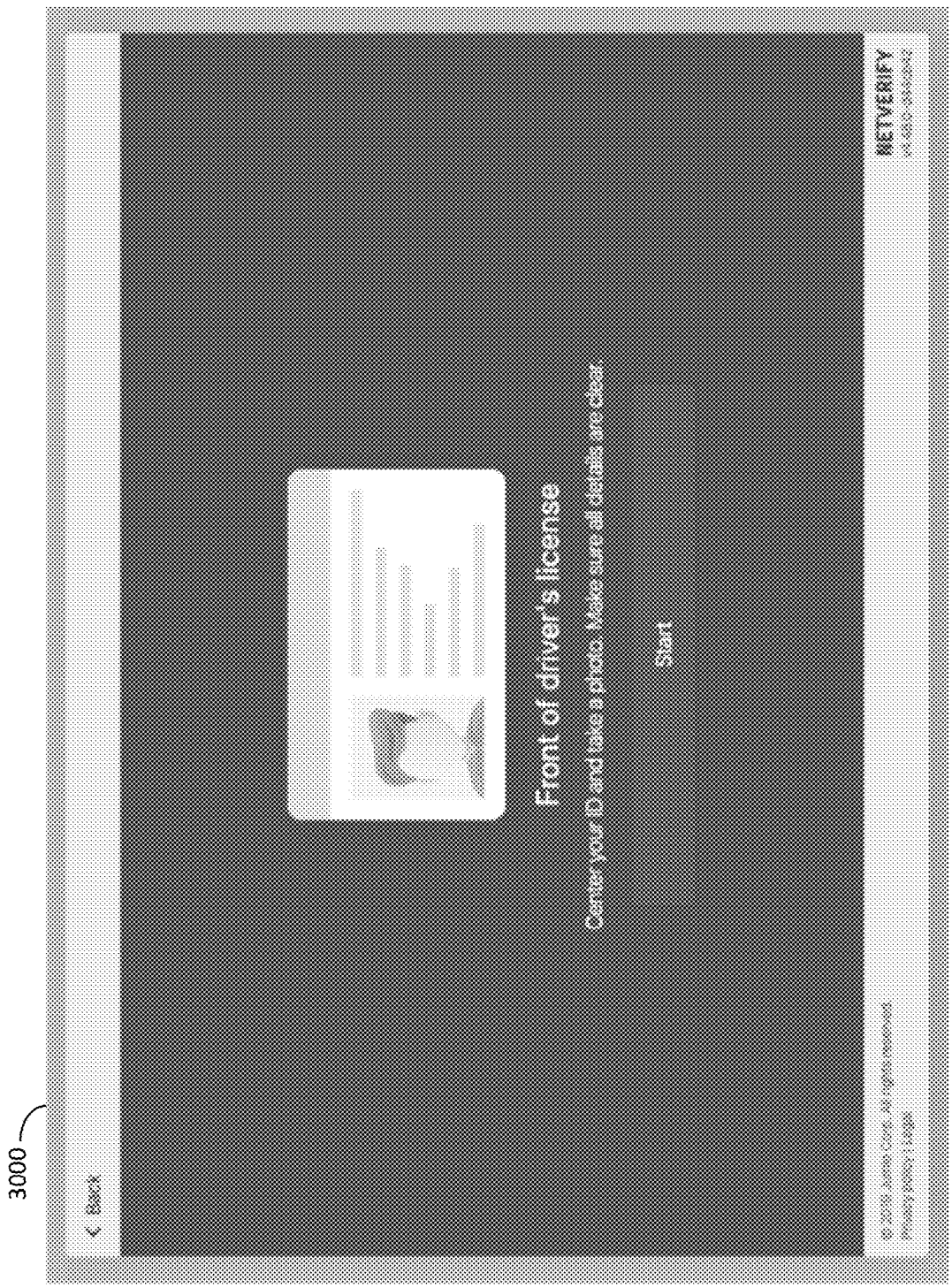
FIG. 30 shows another exemplary screenshot of a user interface displayed on an exemplary computer during enrollment for documentation.
Figure 31:
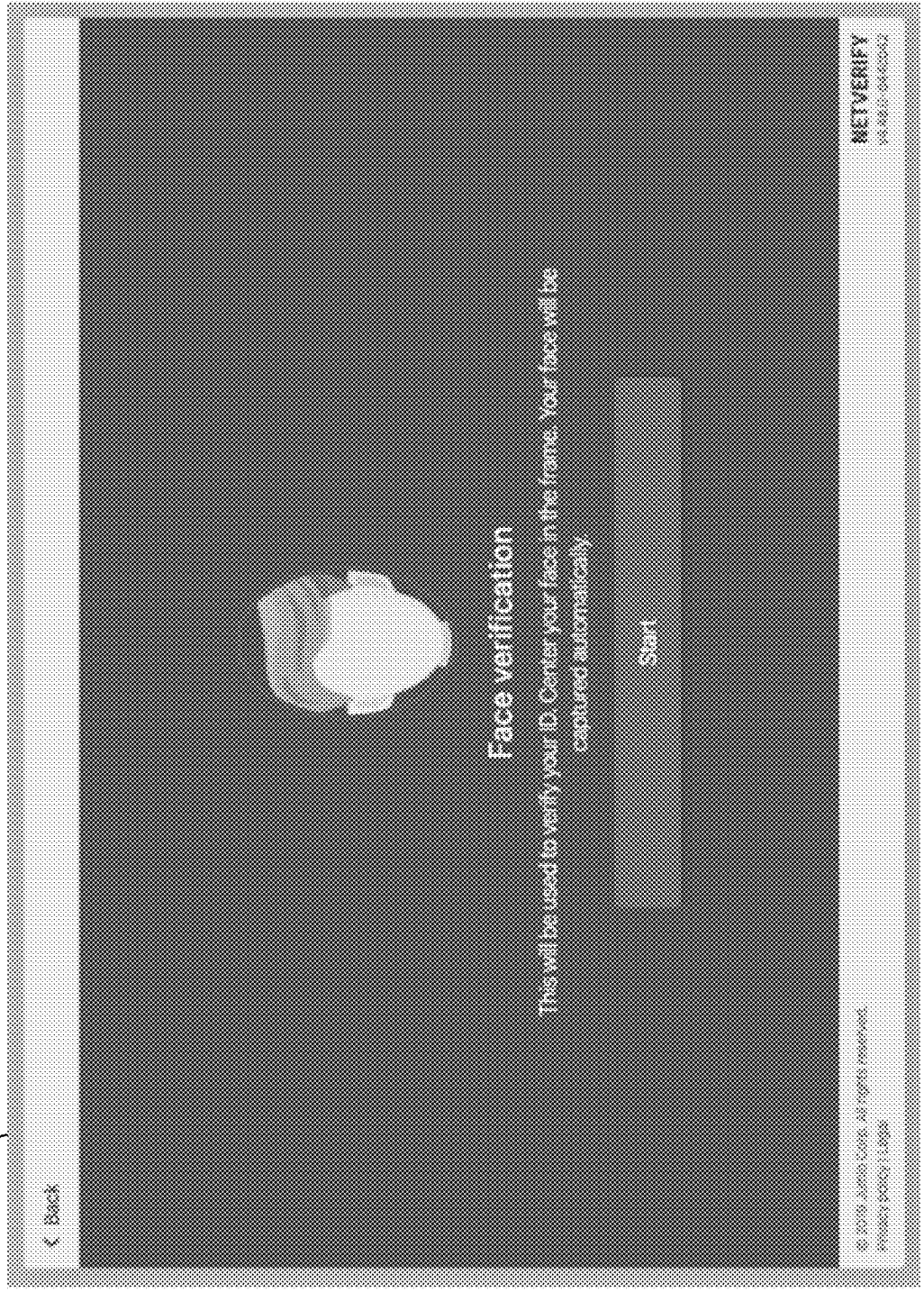
FIG. 31 shows an exemplary screenshot of a user interface displayed on an exemplary computer during enrollment for biometrics.
Figure 32:
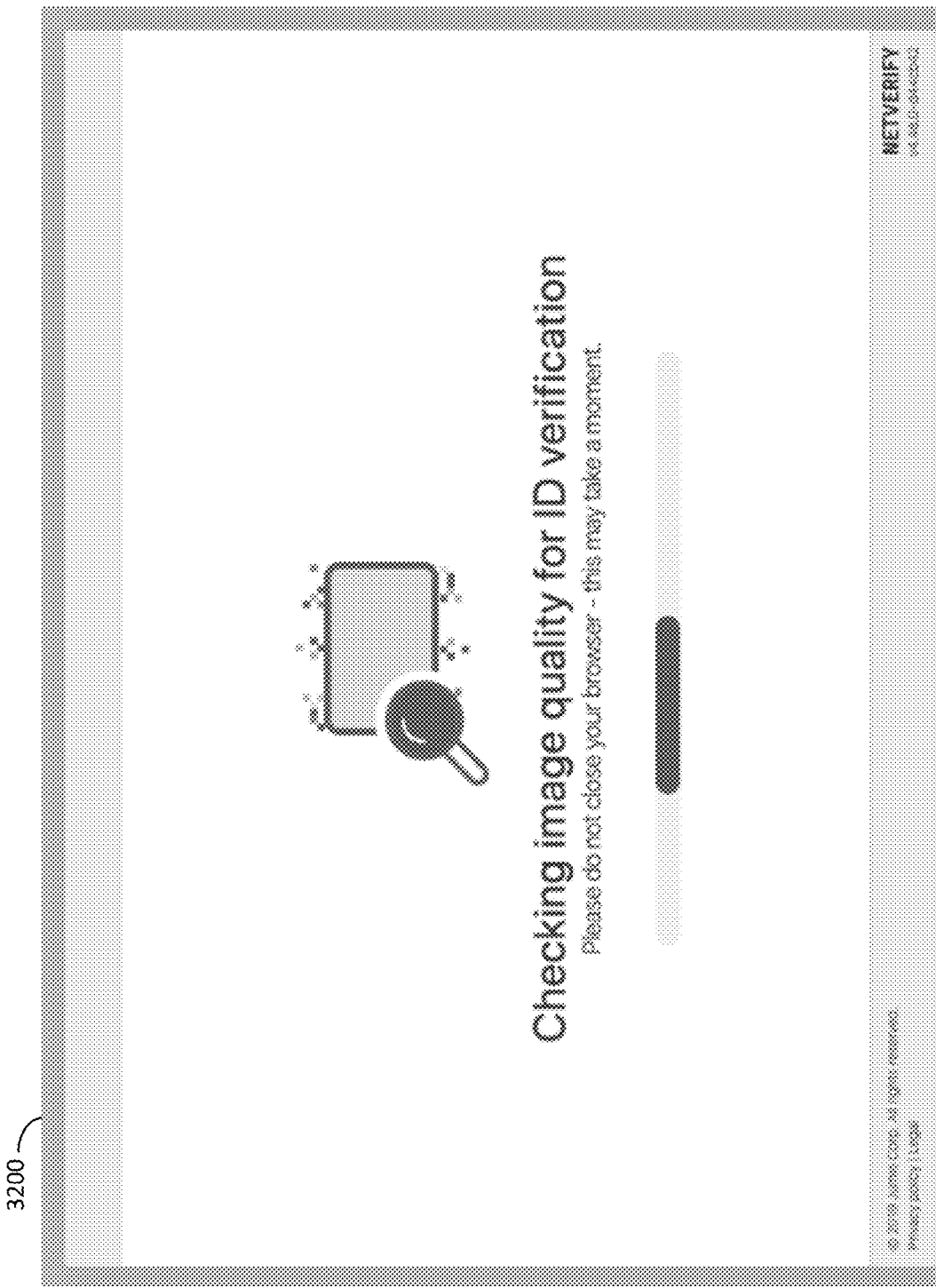
FIG. 32 shows another exemplary screenshot of a user interface displayed on an exemplary computer during enrollment for biometrics.

FIG. 28 is a diagram 2800 depicting exemplary devices connectable to the system on behalf of the actors to implement the systems and methods described above. For example, a laptop computer 2810, desktop computer 2812, mobile device 2814 (e.g., phone, tablet, etc.), server/database 2816, and any other suitable devices may be used to operate within the system. These devices can communicate via communications 2820 through network 2840 or directly via communications 2822. With additional reference to FIG. 1, the devices can act on behalf of and/or as the actors (e.g., holder 110, issuer 120, subscriber 130, administrator 150) to implement the systems and methods described above. For example, these devices can each include instances of a wallet/storage (e.g., 112, 122, 132, 152) and agent (e.g., 114, 124, 134), as well as processors, memory, user interfaces, network interfaces, etc. suitable for communications, data processing, storage, etc. necessary for implementation of the methods and systems.

In one exemplary embodiment, via one of the devices mentioned above, a holder 110 can be initially enrolled to establish a digital ID. For example, the holder 110 can assert a combination of document verification and biometric identification. For example, FIGS. 29-32 show exemplary screenshots of a holder 110 user interface displayed on an exemplary computer 2810 during enrollment for documentation 2900, 3000 and biometrics 3100, 3200.

Once the holder's identity is verified, a digital holder wallet 112 can be created, that he holder 110 can own, control, and manage. The holder 110 can then provide information and/or consent to have the system acquire information about education, training, and work history that can be verified as a credential (e.g., via an administrator 150 acting as a proxy). As the holder 110 receives new credential offers (e.g., via messages) from issuers 120, the holder 110 can individually review and accept the credentials 116 into the holder wallet 112. Credentials 116 can be configured with alerts for notifications when changes occur. Reminders for credentials 116 that require periodic renewal can also be set.

Figure 34:
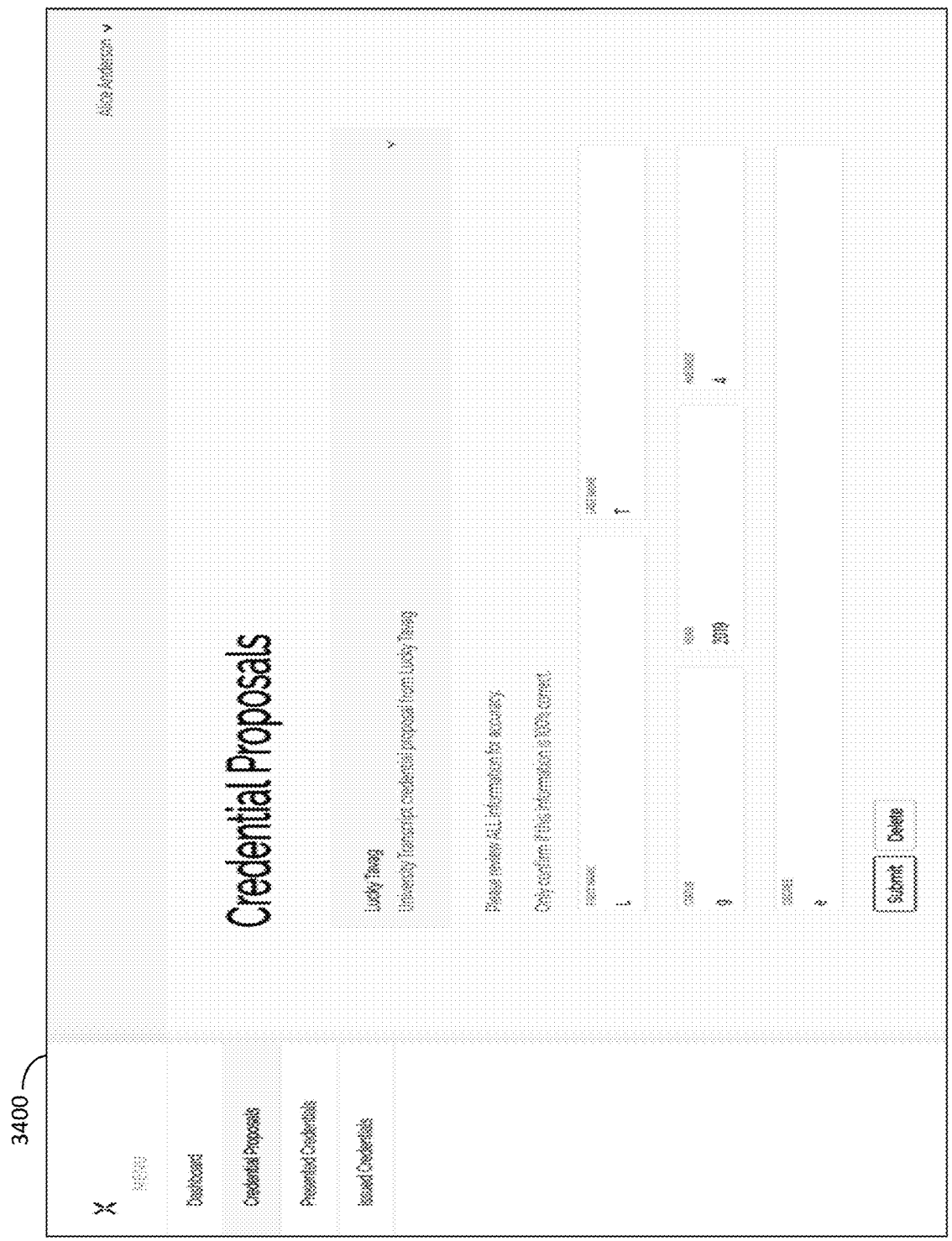
FIG. 34 shows an exemplary screenshot of a user interface displayed on an exemplary computer displaying a credential verification request.

For example: FIG. 33 shows an exemplary screenshot 3300 of a holder 110 user interface displayed on an exemplary computer device 2810 showing credential details; and FIG. 34 shows an exemplary screenshot 3400 of an issuer 120 user interface displayed on an exemplary computer device 2810 showing a credential verification request.

Once issued and stored in the wallet 112, the holder 110 can now share the credentials 116 with participating organizations, for example, that utilize agents complying with the appropriate standard, such as, for example, W3C worldwide standard for digital credentials. Once the holder 110 grants access, subscribers 130 can confirm the validity of the credentials 116 by verifying the cryptographic proof included in the presentation for each attribute in each credential using the associated public keys from their associated credential definitions, potentially reducing your credential processing time from months to seconds. As discussed above, the system can utilize a secure and tamperproof permissioned public verifiable data registry, digital wallet infrastructure, proof lifecycle trackers, and primary source verification engines.

Similarly, the above systems and methods can be applied to various industries with similar needs, including, for example, legal services, financial services, transportation, manufacturing, government, social services, security, and retail, where credentials can include similar assertions regarding identity, education, licensing, work history, provenance, authenticity, outcomes, ingredients, etc. Examples can range from bar admissions (e.g., for attorneys), ownership (e.g., title) to content (e.g., bills of material).

While the embodiments discussed herein have been related to the systems and methods discussed above, these embodiments are intended to be exemplary and are not intended to limit the applicability of these embodiments to only those discussions set forth herein. While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept. In addition, while a particular feature of the disclosed technology may have been described above with respect to only one or more of several illustrated aspects or embodiments, such feature may be combined with one or more other features of the other embodiments, as may be desired and advantageous for any given or particular application. Moreover, in some instances, elements described with one embodiment may be readily adapted for use with other embodiments.

The invention claimed is:

1. A method for defining a configurable requisite collection associated with digital credentials, the method comprising:

selecting a credential schema stored on a verifiable data registry, wherein the credential schema comprises a list of required attributes associated with digital credentials;

configuring at least one rule associated with the required attributes associated with digital credentials;

defining the configurable requisite collection based on the credential schema and the at least one configuration rule;

generating a configurable requisite collection presentation request operable to cause the configurable requisite collection to be evaluated by one or more holders of digital credentials;

transmitting the configurable requisite collection presentation request to a holder;

receiving a configurable requisite collection proposal from the holder, wherein the configurable requisite collection proposal comprises one or more digital credentials associated with the holder;

determining if the holder satisfies requirements of the configurable requisite collection presentation request based on a comparison of the configurable requisite collection to at least one of the one or more digital credentials associated with the holder;

responsive to determining that a digital credential associated with the holder satisfies the requirements of the configurable requisite collection, analyzing a cryptographic proof of the digital crential's validity, non-revocation, and ownership; and verifying the validity, non-revocation, and ownership of the digital credential associated with the holder based upon the cryptographic proof and the verifiable data registry, wherein the cryptographic proof utilizes a public verification key and a private signing key for verification.

2. The method of claim 1, further comprising:

sending a credential presentation subscription request from a subscriber to the holder, wherein the credential presentation subscription request defines a credential presentation subscription, comprising:
  at least one digital credential of the holder; and
  at least one subscription condition;
communicating the credential presentation subscription request to the holder;
determining if the holder consents to the credential presentation subscription;
recording the credential presentation subscription if the holder consents to the credential presentation subscription; and
automatically presenting the at least one digital credential of the holder in accordance with the at least one subscription condition without additional consent from the holder.

3. The method of claim 2, further comprising determining if a credential presentation request conforms with the credential presentation subscription before automatically presenting the at least one credential of the holder.

4. The method of claim 2, wherein the verifiable data registry is a blockchain.

5. The method of claim 2, wherein an issuer issues the at least one digital credential of the holder to the holder and stores a credential status of the digital credential on the verifiable data registry; and further comprising failing to automatically present the at least one digital credential of the holder to the subscriber based on the credential status stored on the verifiable data registry, wherein the credential status is revoked.

6. A system for defining a configurable requisite collection associated with digital credentials, comprising:

an administrator device, wherein the administrator device comprises a processor and a memory for executing logic to:
  provide a subscriber agent to a subscriber device associated with a subscriber, wherein the subscriber is a user of the subscriber device;
  wherein the subscriber agent comprises logic for:
  selecting a credential schema stored on a verifiable data registry, wherein the credential schema comprises a list of required attributes associated with digital credentials;
  configuring at least one rule associated with the required attributes associated with digital credentials;
  defining the configurable requisite collection based on the credential schema and the at least one configuration rule;
  generating a configurable requisite collection presentation request operable to cause the configurable requisite collection to be evaluated by one or more holders of digital credentials;
  transmitting the configurable requisite collection presentation request to a holder;
  receiving a configurable requisite collection proposal from the holder, wherein the configurable requisite collection proposal comprises one or more digital credentials associated with the holder;
  determining if the holder satisfies requirements of the configurable requisite collection presentation request based on a comparison of the configurable requisite collection to at least one of the one or more digital credentials associated with the holder;
  responsive to determining that a digital credential associated with the holder satisfies the requirements of the configurable requisite collection, analyzing a cryptographic proof of the digital credential's validity, non-revocation, and ownership; and
  verifying at least one of the validity, non-revocation, and ownership of the digital credential associated with the holder based upon the cryptographic proof and the verifiable data registry, wherein the cryptographic proof utilizes a public verification key and a private signing key for verification.

7. The system of claim 6,
wherein the administrator device further executes logic to:
provide a holder agent to a holder device associated with the holder,
wherein the holder is a user of the holder device;
wherein the holder agent comprises logic for:
  sending a credential request to an issuer, wherein the credential request comprises an assertion by the holder;
  receiving a digital credential from the issuer according to the credential request; and
further wherein the administrator device further comprises logic to determine an issuer credibility score based on at least one issuer credential characteristic according to a scoring formula.

8. The system of claim 6, wherein
wherein the administrator device further executes logic to:
provide an agent to at least one of a holder device, an issuer device, or a subscriber device associated with a holder, an issuer, or a subscriber, respectively, wherein the holder, the issuer, or the subscriber is a user of the respective device;
wherein the agent comprises logic for:
  sending a message associated with a credential request to another agent,
wherein the credential request comprises an assertion by the holder; and receiving a message associated with the credential request.

9. The system of claim 8, wherein the credential request is associated with a credential presentation.

10. The system of claim 8, wherein the credential request is associated with a credential subscription.

11. The system of claim 8, wherein a proxy communicates on behalf of the holder, the issuer, or the subscriber.

12. The method of claim 1, wherein the cryptographic proof comprises a digital signature.

13. The system of claim 6, wherein the cryptographic proof comprises a digital signature.

* * * * *